(12) United States Patent
Nakagawa et al.

(10) Patent No.: US 12,308,051 B2
(45) Date of Patent: May 20, 2025

(54) MAGNETIC HEAD WITH MULTILAYER CONFIGURATION BETWEEN MAGNETIC POLES AND MAGNETIC RECORDING DEVICE

(71) Applicants: KABUSHIKI KAISHA TOSHIBA, Tokyo (JP); TOSHIBA ELECTRONIC DEVICES & STORAGE CORPORATION, Tokyo (JP)

(72) Inventors: Yuji Nakagawa, Kawasaki Kanagawa (JP); Masayuki Takagishi, Kunitachi Tokyo (JP); Naoyuki Narita, Funabashi Chiba (JP); Tomoyuki Maeda, Kawasaki Kanagawa (JP)

(73) Assignees: KABUSHIKI KAISHA TOSHIBA, Tokyo (JP); TOSHIBA ELECTRONIC DEVICES & STORAGE CORPORATION, Tokyo (JP)

( * ) Notice: Subject to any disclaimer, the term of this patent is extended or adjusted under 35 U.S.C. 154(b) by 0 days.

(21) Appl. No.: 18/363,573

(22) Filed: Aug. 1, 2023

(65) Prior Publication Data
US 2024/0296863 A1 Sep. 5, 2024

(30) Foreign Application Priority Data
Mar. 1, 2023 (JP) .................... 2023-031362

(51) Int. Cl.
*G11B 5/31* (2006.01)
*G11B 5/127* (2006.01)
(Continued)

(52) U.S. Cl.
CPC .......... *G11B 5/3146* (2013.01); *G11B 5/1278* (2013.01); *G11B 5/235* (2013.01);
(Continued)

(58) Field of Classification Search
None
See application file for complete search history.

(56) References Cited

U.S. PATENT DOCUMENTS

| 7,616,412 B2 | 11/2009 | Zhu et al. |
| 9,007,721 B2 | 4/2015 | Sato et al. |

(Continued)

FOREIGN PATENT DOCUMENTS

| JP | 2008-277586 A | 11/2008 |
| JP | 2009-064499 A | 3/2009 |

(Continued)

OTHER PUBLICATIONS

X. Bai and J. -G. Zhu, "Effective Field Analysis of Segmented Media for Microwave-Assisted Magnetic Recording", in IEEE Magnetics Letters, vol. 8, pp. 1-4, 2017.

(Continued)

*Primary Examiner* — Craig A. Renner
(74) *Attorney, Agent, or Firm* — Knobbe, Martens, Olson & Bear, LLP

(57) ABSTRACT

According to one embodiment, a magnetic head includes a first magnetic pole, a second magnetic pole, and a magnetic element provided between the first and the second magnetic poles. The magnetic element includes first to fifth magnetic layers, and first to sixth non-magnetic layers. The sixth non-magnetic layer is provided between the fifth magnetic layer and the second magnetic pole. The sixth non-magnetic layer includes at least one selected from the group consisting of Ru, Ir, Ta, Rh, Pd, Pt and W.

10 Claims, 16 Drawing Sheets

(51) Int. Cl.
   *G11B 5/235* (2006.01)
   *G11B 5/00* (2006.01)
(52) U.S. Cl.
   CPC ............ *G11B 5/3133* (2013.01); *G11B 5/314* (2013.01); *G11B 2005/0005* (2013.01); *G11B 2005/0024* (2013.01)

(56) References Cited

U.S. PATENT DOCUMENTS

| | | | |
|---|---|---|---|
| 9,064,508 | B1 | 6/2015 | Shiimoto et al. |
| 9,117,474 | B1 | 8/2015 | Contreras et al. |
| 10,325,618 | B1 | 6/2019 | Wu et al. |
| 10,522,174 | B1 | 12/2019 | Chen et al. |
| 10,714,129 | B1 | 7/2020 | Tang et al. |
| 10,937,450 | B1 | 3/2021 | Kawasaki et al. |
| 11,393,493 | B1 | 7/2022 | Nakagawa et al. |
| 11,398,244 | B2 | 7/2022 | Takagishi et al. |
| 11,568,891 | B1 | 1/2023 | Chen et al. |
| 2005/0053805 | A1 | 3/2005 | Hinoue et al. |
| 2006/0051620 | A1 | 3/2006 | Hinoue et al. |
| 2006/0057429 | A1 | 3/2006 | Hinoue et al. |
| 2006/0292401 | A1 | 12/2006 | Suzuki et al. |
| 2008/0019040 | A1 | 1/2008 | Zhu et al. |
| 2008/0268291 | A1 | 10/2008 | Akiyama et al. |
| 2009/0052095 | A1 | 2/2009 | Yamada et al. |
| 2009/0059417 | A1 | 3/2009 | Takeo et al. |
| 2009/0197120 | A1 | 8/2009 | Taguchi et al. |
| 2009/0258253 | A1 | 10/2009 | Hinoue et al. |
| 2012/0126905 | A1 | 5/2012 | Zhang et al. |
| 2012/0164487 | A1 | 6/2012 | Childress et al. |
| 2012/0176702 | A1 | 7/2012 | Yamada et al. |
| 2013/0050869 | A1 | 2/2013 | Nagasaka et al. |
| 2015/0043106 | A1 | 2/2015 | Yamada et al. |
| 2016/0027455 | A1 | 1/2016 | Kudo et al. |
| 2019/0088275 | A1 | 3/2019 | Narita et al. |
| 2020/0090685 | A1 | 3/2020 | Takagishi et al. |
| 2020/0294537 | A1 | 9/2020 | Nagawawa et al. |
| 2020/0381012 | A1 | 12/2020 | Chembrolu et al. |
| 2020/0402532 | A1 | 12/2020 | Asif Bashir et al. |
| 2021/0125631 | A1 | 4/2021 | Bai et al. |
| 2021/0142821 | A1 | 5/2021 | Iwasaki et al. |
| 2021/0375309 | A1 | 12/2021 | Iwasaki et al. |
| 2022/0005497 | A1 | 1/2022 | Takagishi et al. |
| 2022/0084551 | A1 | 3/2022 | Koizumi |
| 2022/0157335 | A1 | 5/2022 | Iwasaki |
| 2022/0270640 | A1 | 8/2022 | Nakagawa et al. |
| 2022/0270641 | A1 | 8/2022 | Nakagawa et al. |
| 2022/0399035 | A1* | 12/2022 | Goncharov et al. . G11B 5/3146 |
| 2023/0031273 | A1 | 2/2023 | Nakagawa et al. |
| 2023/0046928 | A1 | 2/2023 | Nakagawa et al. |
| 2023/0178102 | A1 | 6/2023 | Nakagawa et al. |
| 2023/0386510 | A1 | 11/2023 | Nakagawa et al. |
| 2024/0029759 | A1* | 1/2024 | Chen et al. .......... G11B 5/3146 |
| 2024/0144961 | A1 | 5/2024 | Asif Bashir et al. |
| 2024/0144962 | A1 | 5/2024 | Asif Bashir et al. |
| 2024/0144963 | A1 | 5/2024 | Asif Bashir et al. |
| 2024/0296861 | A1 | 9/2024 | Nakagawa et al. |
| 2024/0296862 | A1 | 9/2024 | Nakagawa et al. |
| 2024/0296863 | A1 | 9/2024 | Nakagawa et al. |
| 2024/0296864 | A1 | 9/2024 | Nakagawa et al. |
| 2024/0296865 | A1* | 9/2024 | Nakagawa ........... G11B 5/3146 |

FOREIGN PATENT DOCUMENTS

| | | |
|---|---|---|
| JP | 4358279 B2 | 11/2009 |
| JP | 2012-146351 A | 8/2012 |
| JP | 2019-057338 A | 4/2019 |
| JP | 2022-012263 A | 1/2022 |
| JP | 2022-050037 A | 3/2022 |
| JP | 2022-129730 A | 9/2022 |
| JP | 2023-083663 A | 6/2023 |

OTHER PUBLICATIONS

T. Tanaka, et al., "MAMR writability and signal-recording characteristics on granular exchange-coupled composite media" in Journal of Magnetism and Magnetic Materials 529 (2021).

Final Office Action of corresponding U.S. Appl. No. 18/363,613 issued on Apr. 22, 2024 in 9 pages.

Office Action of corresponding U.S. Appl. No. 18/358,872 issued on Jun. 18, 2024, 15 pages.

Office Action of corresponding U.S. Appl. No. 18/363,624 issued on Sep. 19, 2024, 9 pages.

Office Action received in U.S. Appl. No. 18/363/423 dated Nov. 14, 2024 in 26 pages.

Office Action issued in U.S. Appl. No. 18/358,677 dated Oct. 15, 2024 in 24 pages.

* cited by examiner

MAGNETIC HEAD WITH MULTILAYER CONFIGURATION BETWEEN MAGNETIC POLES AND MAGNETIC RECORDING DEVICE

CROSS-REFERENCE TO RELATED APPLICATIONS

This application is based upon and claims the benefit of priority from Japanese Patent Application No. 2023-031362, filed on Mar. 1, 2023; the entire contents of which are incorporated herein by reference.

FIELD

Embodiments described herein relate generally to a magnetic head and a magnetic recording device.

BACKGROUND

Information is recorded on a magnetic recording medium such as an HDD (Hard Disk Drive) using a magnetic head. It is desired to improve recording density in the magnetic recording device.

DETAILED DESCRIPTION

Figure 1:
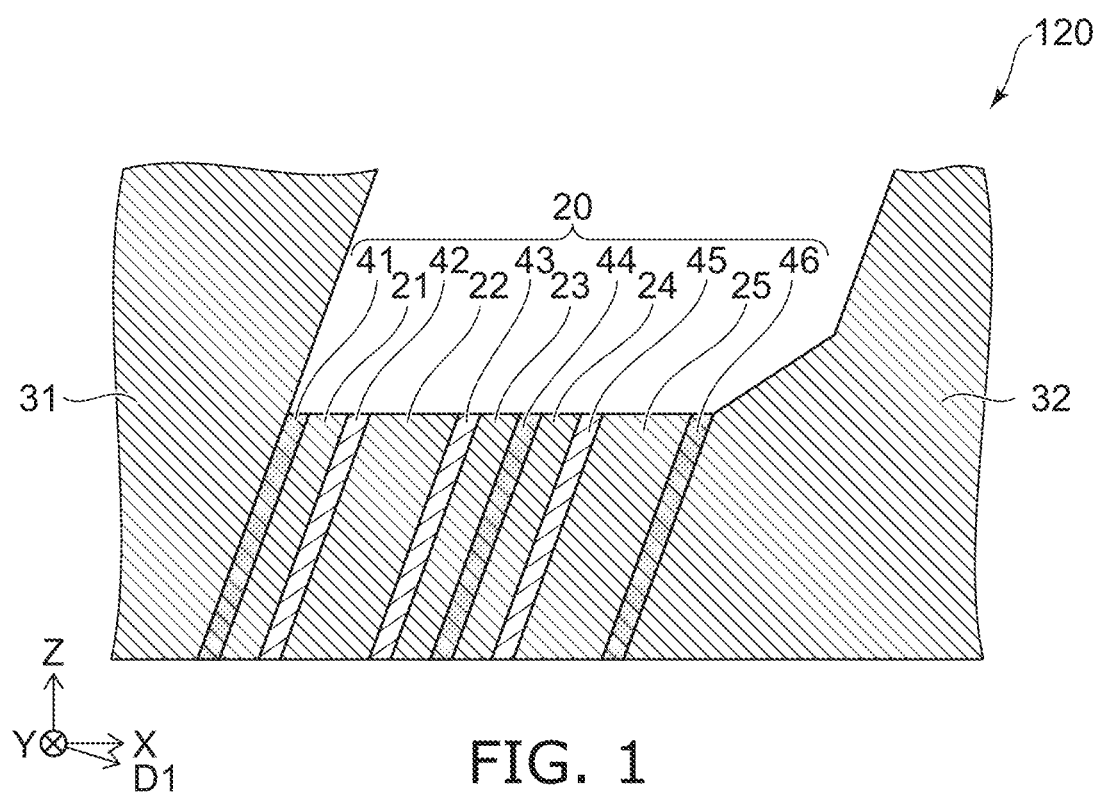
FIG. 1 is a schematic cross-sectional view illustrating a magnetic head according to a first embodiment.

According to one embodiment, a magnetic head includes a first magnetic pole, a second magnetic pole, and a magnetic element provided between the first magnetic pole and the second magnetic pole. The magnetic element includes a first magnetic layer, a second magnetic layer provided between the first magnetic layer and the second magnetic pole, a third magnetic layer provided between the second magnetic layer and the second magnetic pole, a fourth magnetic layer provided between the third magnetic layer and the second magnetic pole, a fifth magnetic layer provided between the fourth magnetic layer and the second magnetic pole, a first non-magnetic layer provided between the first magnetic pole and the first magnetic layer, a second non-magnetic layer provided between the first magnetic layer and the second magnetic layer, a third non-magnetic layer provided between the second magnetic layer and the third magnetic layer, a fourth non-magnetic layer provided between the third magnetic layer and the fourth magnetic layer, a fifth non-magnetic layer provided between the fourth magnetic layer and the fifth magnetic layer, and a sixth non-magnetic layer provided between the fifth magnetic layer and the second magnetic pole. The sixth non-magnetic layer includes at least one selected from the group consisting of Ru, Ir, Ta, Rh, Pd, Pt and W.

Various embodiments are described below with reference to the accompanying drawings.

The drawings are schematic and conceptual; and the relationships between the thickness and width of portions, the proportions of sizes among portions, etc., are not necessarily the same as the actual values. The dimensions and proportions may be illustrated differently among drawings, even for identical portions.

In the specification and drawings, components similar to those described previously or illustrated in an antecedent drawing are marked with like reference numerals, and a detailed description is omitted as appropriate.

First Embodiment

FIG. 1 is a schematic cross-sectional view illustrating a magnetic head according to a first embodiment.

Figure 2:
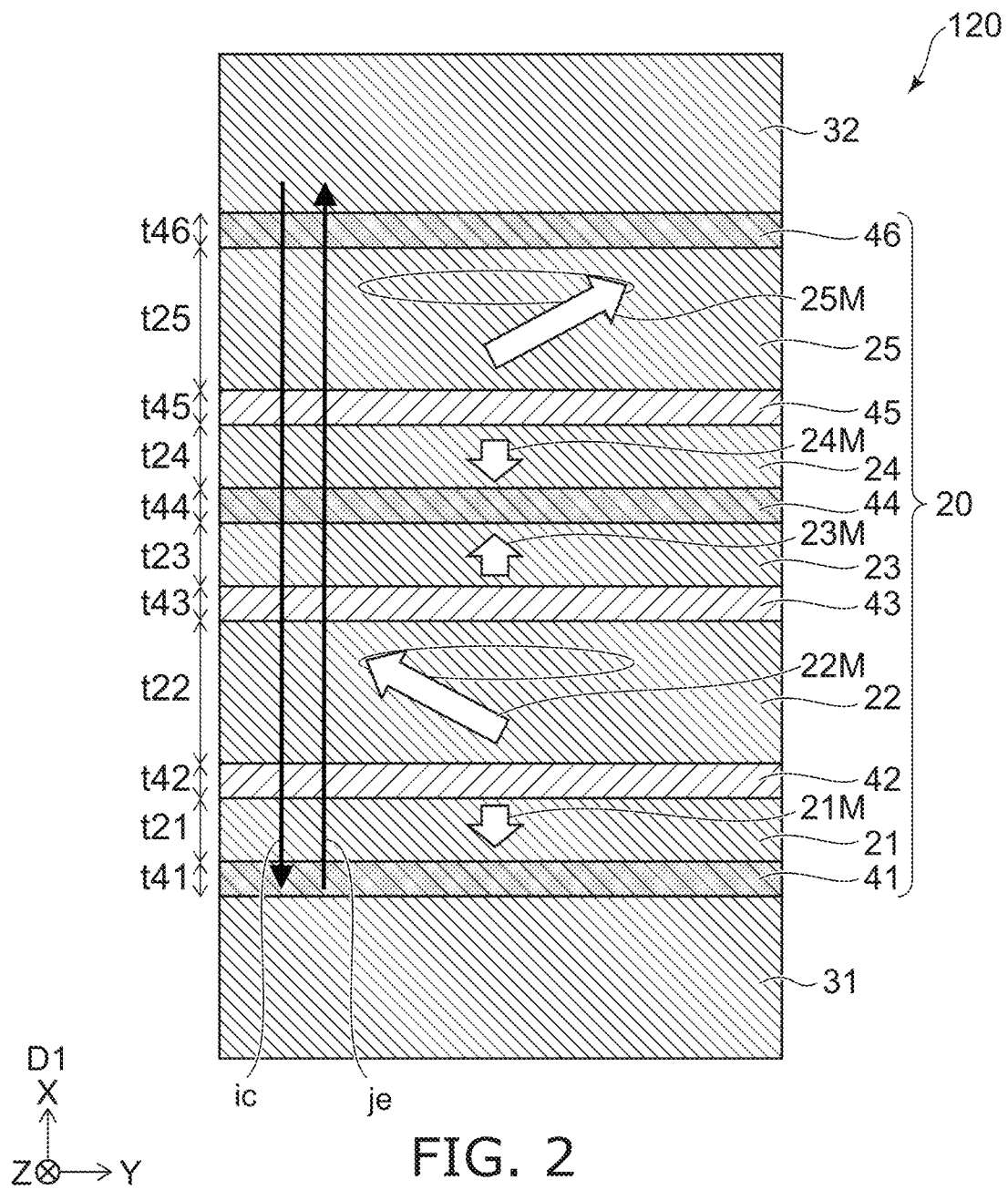
FIG. 2 is a schematic plan view illustrating the magnetic head according to the first embodiment.

FIG. 2 is a schematic plan view illustrating the magnetic head according to the first embodiment.

Figure 3:
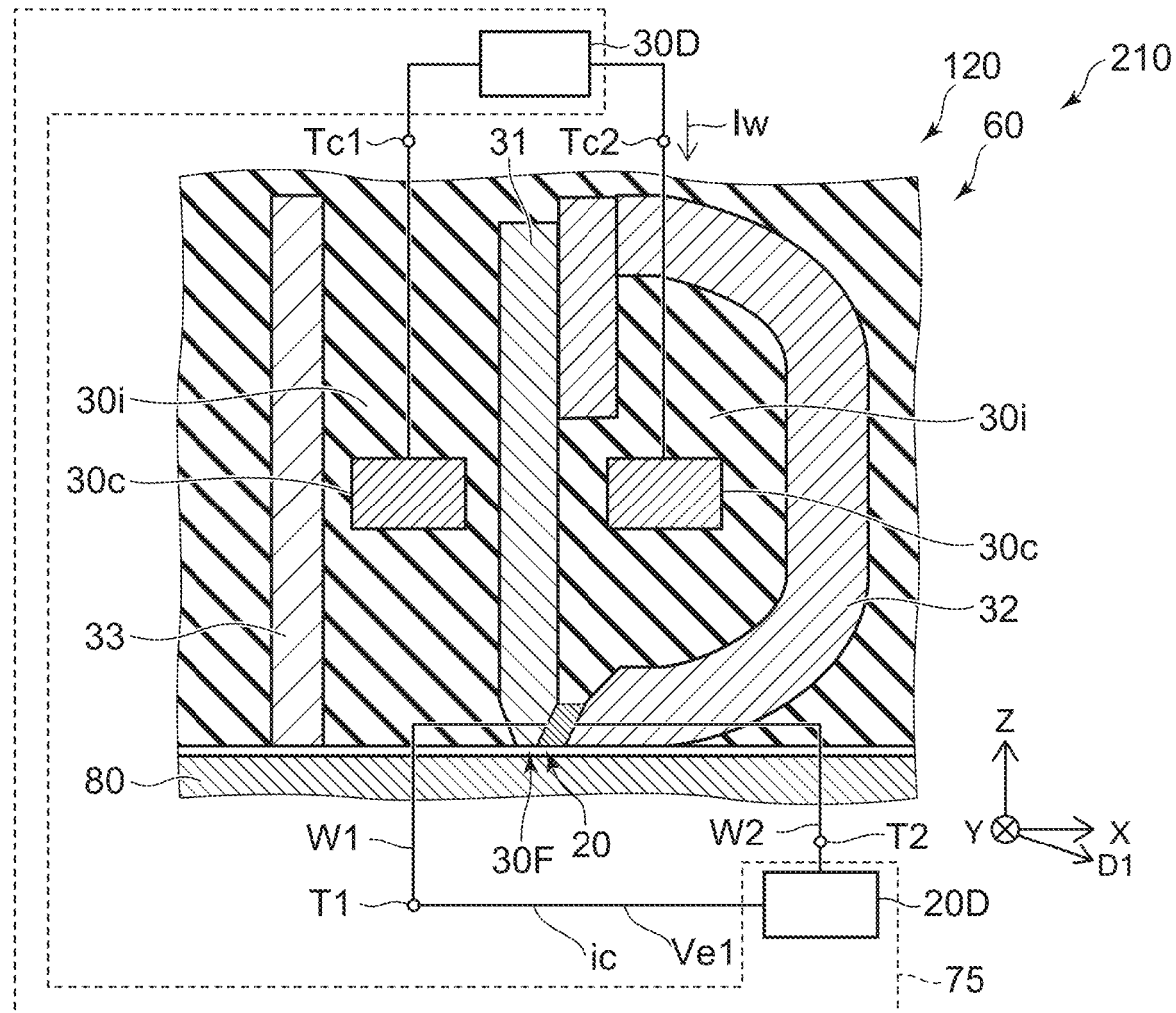
FIG. 3 is a schematic cross-sectional view illustrating the magnetic recording device including the magnetic head according to the first embodiment.

FIG. 3 is a schematic cross-sectional view illustrating the magnetic recording device including the magnetic head according to the first embodiment.

As shown in FIG. 3, a magnetic recording device 210 according to the embodiment includes a magnetic head 120 and a controller 75. The magnetic recording device 210 may include a magnetic recording medium 80. At least a recording operation is performed in the magnetic recording device 210. In the recording operation, information is recorded on the magnetic recording medium 80 using the magnetic head 120.

The magnetic head 120 includes a first magnetic pole 31, a second magnetic pole 32 and a magnetic element 20. The magnetic head 120 may include coil 30c. The first magnetic pole 31, the second magnetic pole 32, the magnetic element 20 and the coil 30c are included in the recording section 60. As will be described below, the magnetic head 120 may include a reproducing section. The magnetic element 20 is provided between the first magnetic pole 31 and the second magnetic pole 32.

For example, the first magnetic pole 31 and the second magnetic pole 32 form a magnetic circuit. The first magnetic pole 31 is, for example, a main magnetic pole. The second magnetic pole 32 is, for example, a trailing shield. The first magnetic pole 31 may be the trailing shield and the second magnetic pole 32 may be the main pole.

A direction from the magnetic recording medium 80 to the magnetic head 120 is defined as a Z-axis direction. One direction perpendicular to the Z-axis direction is defined as an X-axis direction. A direction perpendicular to the Z-axis direction and the X-axis direction is defined as a Y-axis direction. The Z-axis direction corresponds to, for example, the height direction. The X-axis direction corresponds to, for example, the down-track direction. The Y-axis direction corresponds to, for example, the cross-track direction. The magnetic recording medium 80 and the magnetic head 120 move relatively along the down-track direction. A recording magnetic field generated by a magnetic head 120 is applied to a desired position on the magnetic recording medium 80. Magnetization at a desired position of the magnetic recording medium 80 is controlled in a direction according to the recording magnetic field. Thus, information is recorded on the magnetic recording medium 80.

A direction from the first magnetic pole 31 to the second magnetic pole 32 is defined as a first direction D1. The first direction D1 is substantially along the X-axis direction. In the embodiments, the first direction D1 may be inclined with respect to the X-axis direction. The angle of inclination is, for example, more than 0 degrees and not more than 30 degrees.

In this example, a portion of coil 30c is provided between the first magnetic pole 31 and the second magnetic pole 32. In this example, a shield 33 is provided. The first magnetic pole 31 is provided between the shield 33 and the second magnetic pole 32 in the X-axis direction. Another portion of coil 30c is provided between the shield 33 and the first magnetic pole 31. An insulating portion 30i is provided between these multiple elements. The shield 33 is, for example, a leading shield. The magnetic head 120 may also include side shields (not shown).

As shown in FIG. 3, the first magnetic pole 31 includes a medium facing surface 30F. The medium facing surface 30F is, for example, an ABS (Air Bearing Surface). The medium facing surface 30F faces the magnetic recording medium 80, for example. The medium facing surface 30F extends, for example, along the X-Y plane.

As shown in FIG. 3, the controller 75 includes a recording circuit 30D and an element circuit 20D. A recording current Iw is supplied from the recording circuit 30D to the coil 30c. For example, a first coil terminal Tc1 and a second coil terminal Tc2 are provided on the coil 30c. The recording current Iw is supplied to the coil 30c via these coil terminals. The recording magnetic field corresponding to the recording current Iw is applied to the magnetic recording medium 80 from the first magnetic pole 31.

As shown in FIG. 3, the element circuit 20D is electrically connected to the magnetic element 20. In this example, the magnetic element 20 is electrically connected to the first magnetic pole 31 and the second magnetic pole 32. In the magnetic head 120, a first terminal T1 and a second terminal T2 are provided. The first terminal T1 is electrically connected to one end of the magnetic element 20 via the first wiring W1 and the first magnetic pole 31. The second terminal T2 is electrically connected to the other end of the magnetic element 20 via the second wiring W2 and the second magnetic pole 32. For example, an element current ic is supplied to the magnetic element 20 from the element circuit 20D. The element current ic is direct current, for example.

The element circuit 20D applies an element voltage Ve1 between the first terminal T1 and the second terminal T2. The element current ic based on the element voltage Ve1 flows through the magnetic element 20.

For example, by the element current ic equal to or higher than a threshold value flowing through the magnetic element 20, oscillation occurs in a magnetic layer included in the magnetic element 20. The magnetic element 20 functions, for example, as an STO (Spin-Torque Oscillator). An alternating magnetic field (for example, a high-frequency magnetic field) is generated from the magnetic element 20 along with the oscillation. An alternating magnetic field generated by the magnetic element 20 is applied to the magnetic recording medium 80 to assist recording on the magnetic recording medium 80. For example, MAMR (Microwave Assisted Magnetic Recording) can be performed.

As described above, the controller 75 is configured to supply the recording current Iw to the coil 30c and supply the element current ic to the magnetic element 20.

FIG. 2 corresponds to a plan view of the medium facing surface 30F viewed from the magnetic recording medium 80.

As shown in FIGS. 1 and 2, the magnetic element 20 includes a first magnetic layer 21, a second magnetic layer 22, a third magnetic layer 23, a fourth magnetic layer 24, a fifth magnetic layer 25, and a first non-magnetic layer. 41, a second non-magnetic layer 42, a third non-magnetic layer 43, a fourth non-magnetic layer 44, a fifth non-magnetic layer 45 and a sixth non-magnetic layer 46.

The second magnetic layer 22 is provided between the first magnetic layer 21 and the second magnetic pole 32. The third magnetic layer 23 is provided between the second magnetic layer 22 and the second magnetic pole 32. The fourth magnetic layer 24 is provided between the third magnetic layer 23 and the second magnetic pole 32. The fifth magnetic layer 25 is provided between the fourth magnetic layer 24 and the second magnetic pole 32.

The first non-magnetic layer 41 is provided between the first magnetic pole 31 and the first magnetic layer 21. The second non-magnetic layer 42 is provided between the first magnetic layer 21 and the second magnetic layer 22. The third non-magnetic layer 43 is provided between the second magnetic layer 22 and the third magnetic layer 23. The fourth non-magnetic layer 44 is provided between the third magnetic layer 23 and the fourth magnetic layer 24. The fifth non-magnetic layer 45 is provided between the fourth magnetic layer 24 and the fifth magnetic layer 25. The sixth non-magnetic layer 46 is provided between the fifth magnetic layer 25 and the second magnetic pole 32.

In the embodiments, the sixth non-magnetic layer 46 includes at least one selected from the group consisting of Ru, Ir, Ta, Rh, Pd, Pt and W.

By such a configuration, highly efficient and stable oscillation can be obtained. According to the embodiments, it is possible to provide a magnetic head capable of improving the recording density. An example of simulation results of the characteristics of the magnetic element will be described below.

As shown in FIG. 2, a thickness of the first magnetic layer 21 in a first direction D1 is defined as a first thickness t21.

A first direction D1 is a direction from the first magnetic pole 31 to the second magnetic pole 32. A thickness of the second magnetic layer 22 in the first direction D1 is defined as a second thickness t22. A thickness of the third magnetic layer 23 in the first direction D1 is defined as a third thickness t23. A thickness of the fourth magnetic layer 24 in the first direction D1 is defined as a fourth thickness t24. A thickness of the fifth magnetic layer 25 in the first direction D1 is defined as a fifth thickness t25.

In the magnetic head 120, the second thickness t22 is thicker than the first thickness t21. The second thickness t22 is thicker than the third thickness t23. In the magnetic head 120, the fourth thickness t24 is thinner than the fifth thickness t25.

Figure 4:
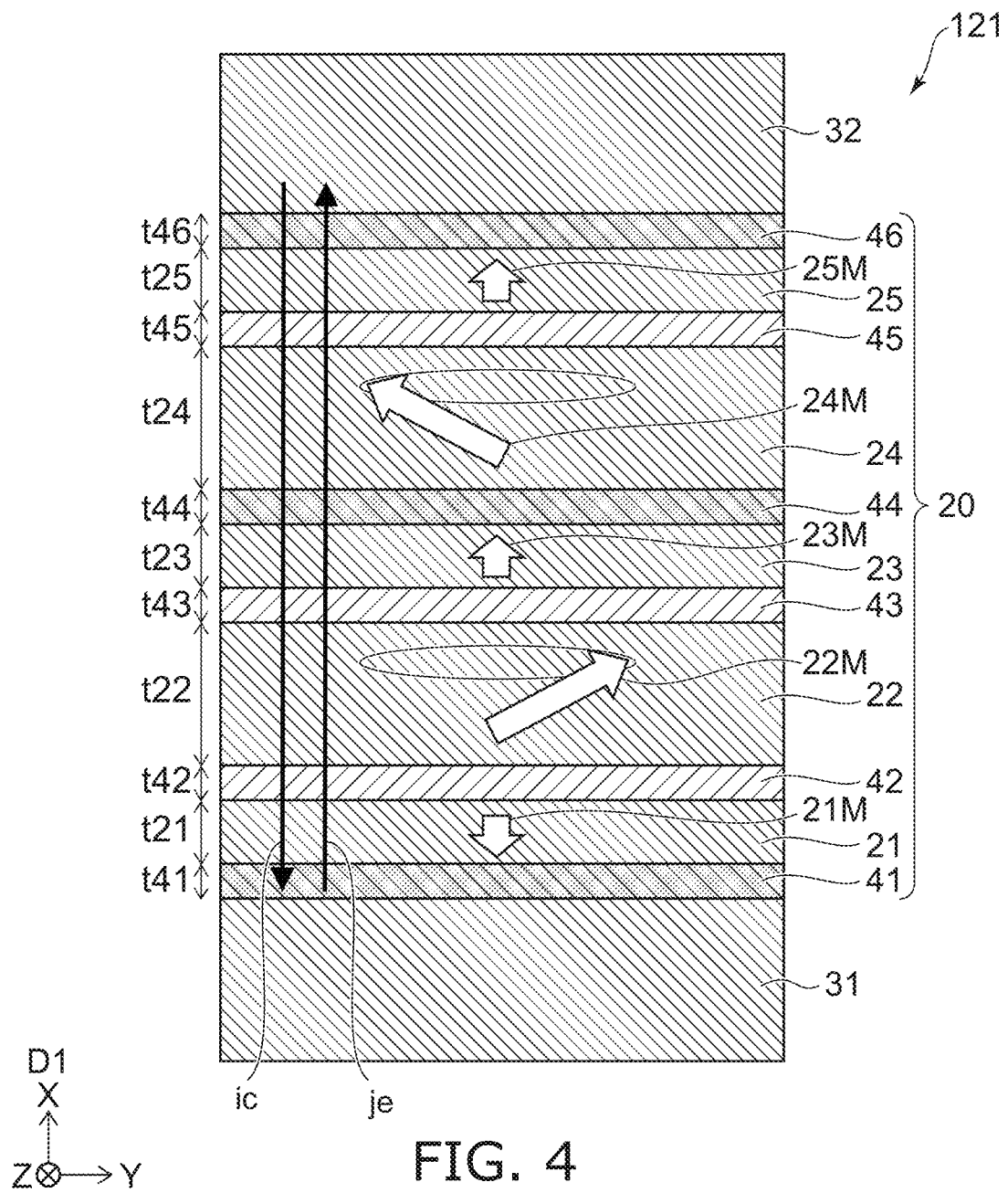
FIG. 4 is a schematic plan view illustrating a magnetic head according to the first embodiment.

FIG. 4 is a schematic plan view illustrating a magnetic head according to the first embodiment.

As shown in FIG. 4, a magnetic head 121 according to the embodiment also includes the above five magnetic layers and six non-magnetic layers. Also in the magnetic head 121, the second thickness t22 is thicker than the first thickness t21. The second thickness t22 is thicker than the third thickness t23. On the other hand, in the magnetic head 121, the fourth thickness t24 is thicker than the fifth thickness t25. Even in such a magnetic head 121, highly efficient and stable oscillation can be obtained.

The magnetization of the magnetic pole (e.g., the second magnetic pole 32) is not always stable and may oscillate. Thus, it is preferable that stable oscillation be obtained in the magnetic element 20 even when the magnetization of the second magnetic pole 32 is unstable. In the magnetic heads 120 and 121 according to the embodiment, stable oscillation can be obtained even when the magnetization of the second magnetic pole 32 is unstable.

Figure 5:
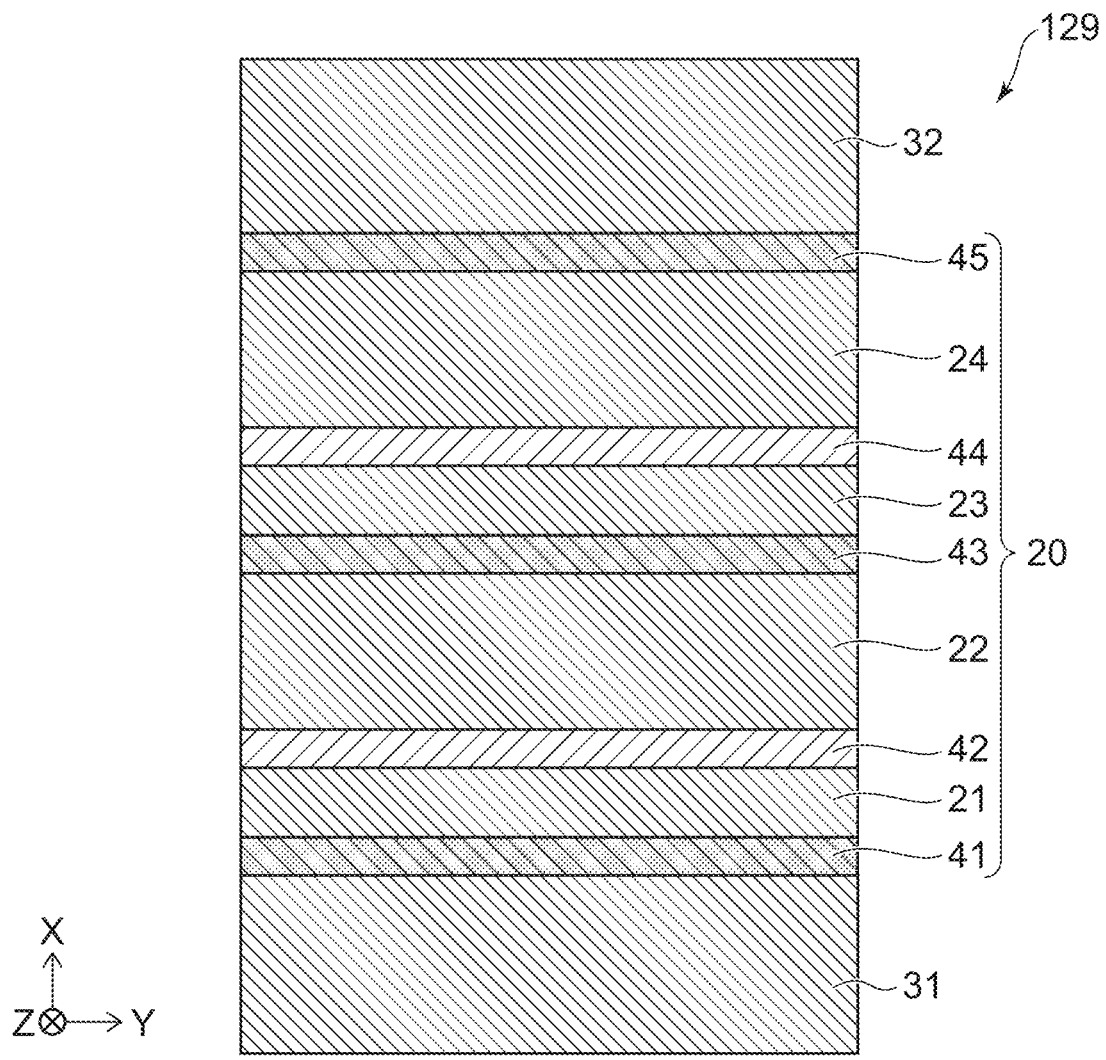
FIG. 5 is a schematic plan view illustrating a magnetic head of a reference example.

FIG. 5 is a schematic plan view illustrating a magnetic head of a reference example.

FIG. 5 shows a magnetic head 129 of a reference example. The magnetic head 129 has four magnetic layers and five non-magnetic layers. In the magnetic head 129, the fifth non-magnetic layer 45 includes at least one selected from the group consisting of Ru, Ir, Ta, Rh, Pd, Pt and W.

Figure 6:
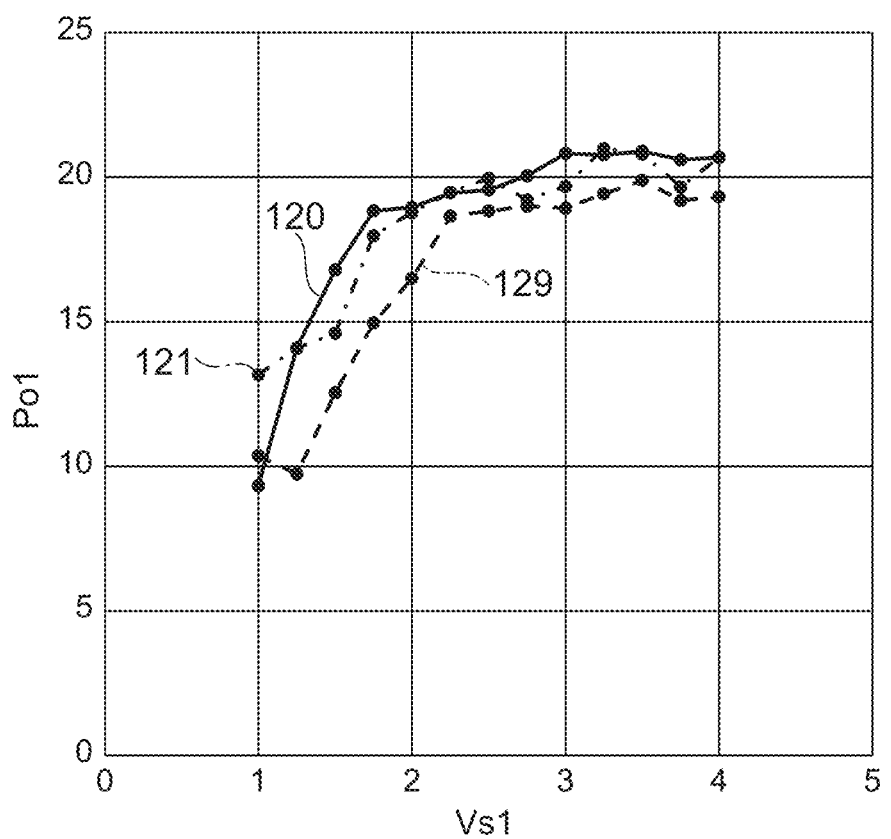
FIG. 6 is a graph illustrating characteristics of the magnetic heads.

FIG. 6 is a graph illustrating characteristics of the magnetic heads.

FIG. 6 illustrates simulation results of the characteristics of the magnetic heads 120, 122 and 129. In the simulation model, the magnetization of the second magnetic pole 32 is movable.

The horizontal axis of FIG. 6 is an applied voltage Vs1 being normalized. The applied voltage Vs1 is applied between one end of the magnetic element 20 and the other end. The vertical axis is an oscillation parameter Po1. The higher the oscillation parameter Po1, the higher the intensity of stable oscillation.

As shown in FIG. 6, in the magnetic heads 120 and 121, a higher oscillation parameter Po1 than the magnetic head 129 of the reference example is obtained. In the magnetic heads 120 and 121, a high oscillation parameter Po1 can be obtained at a low applied voltage compared to the magnetic head 129 of the reference example. The oscillation parameter Po1 is lower than the oscillation parameter Po1 in the magnetic heads 120 and 121 even when the thickness relationships of the magnetic layers included in the magnetic head 129 of the reference example are changed.

By a configuration in which the number of magnetic layers is five, high-intensity oscillation can be obtained. Oscillation can be obtained at a low element voltage Ve1 (small element current ic). According to the embodiments, it is possible to provide a magnetic head capable of improving the recording density.

As described above, the sixth non-magnetic layer 46 includes at least one selected from the group consisting of Ru, Ir, Ta, Rh, Pd, Pt and W. Thereby, for example, the influence of the magnetization of the second magnetic pole 32 is suppressed. For example, stable oscillation can be easily obtained in the fourth magnetic layer 24 or the fifth magnetic layer 25.

In embodiments, the first non-magnetic layer 41 includes at least one selected from the group consisting of Ru, Ir, Ta, Rh, Pd, Pt and W, for example. For example, the fourth non-magnetic layer 44 includes at least one selected from the group consisting of Ru, Ir, Ta, Rh, Pd, Pt and W.

In the embodiments, for example, the second non-magnetic layer 42 includes at least one selected from the group consisting of Cu, Au, Cr, Al, V and Ag. The third non-magnetic layer 43 includes at least one selected from the group consisting of Cu, Au, Cr, Al, V and Ag. The fifth non-magnetic layer 45 includes at least one selected from the group consisting of Cu, Au, Cr, Al, V and Ag.

At least one of the first magnetic layer 21, the second magnetic layer 22, the third magnetic layer 23, the fourth magnetic layer 24, or the fifth magnetic layer 25 includes at least one selected from the group consisting of Fr, Co, and Ni. These magnetic layers are, for example, ferromagnetic layers.

In the magnetic head 120 illustrated in FIG. 2, the second magnetic layer 22 and the fifth magnetic layer 25 function, for example, as oscillation layers. The first magnetic layer 21, the third magnetic layer 23, and the fourth magnetic layer 24 function, for example, as spin injection layers. In the magnetic head 120, the magnetization 22M of the second magnetic layer 22 and the magnetization 25M of the fifth magnetic layer 25 oscillate when, for example, the element current ic equal to or higher than the threshold value flows through the magnetic element 20. For example, the alternating magnetic field is generated.

In the magnetic head 120, for example, the component of the magnetization 23M of the third magnetic layer 23 along the first direction D1 is opposite to the component of the magnetization 21M of the first magnetic layer 21 along the first direction D1. The component of the magnetization 24M of the fourth magnetic layer 24 along the first direction D1 is opposite to the component of the magnetization 23M of the third magnetic layer 23 along the first direction D1.

As shown in FIG. 2, a thickness of the first non-magnetic layer 41 in the first direction D1 is defined as a first non-magnetic layer thickness t41. A thickness of the second non-magnetic layer 42 in the first direction D1 is defined as a second non-magnetic layer thickness t42. A thickness of the third non-magnetic layer 43 in the first direction D1 is defined as a third non-magnetic layer thickness t43. A thickness of the fourth non-magnetic layer 44 in the first direction D1 is defined as a fourth non-magnetic layer thickness t44. A thickness of the fifth non-magnetic layer 45 in the first direction D1 is defined as a fifth non-magnetic layer thickness t45. A thickness of the sixth non-magnetic layer 46 in the first direction D1 is defined as a sixth non-magnetic layer thickness t46.

In the magnetic head 120, for example, the second thickness t22 may be not less than 1.5 times and not more than 10 times the first thickness t21. The second thickness t22 may be not less than 1.5 times and not more than 10 times the third thickness t23. The second thickness t22 may be not less than 1.5 times and not more than 10 times the fourth thickness t24. For example, the fifth thickness t25 may be not less than 1.5 times and not more than 10 times the fourth thickness t24. The fifth thickness t25 may be not less than 1.5 times and not more than 10 times the third thickness t23. The fifth thickness t25 may be not less than 1.5 times and not more than 10 times the first thickness t21.

In the magnetic head 120, for example, the first thickness t21 is not less than 0.5 nm and not more than 5 nm. For example, the second thickness t22 is not less than 4 nm and not more than 15 nm. For example, the third thickness t23 is not less than 0.5 nm and not more than 5 nm. For example, the fourth thickness t24 is not less than 0.5 nm and not more than 5 nm. For example, the fifth thickness t25 is not less than 4 nm and not more than 15 nm.

In the magnetic head 121 illustrated in FIG. 4, the second magnetic layer 22 and the fourth magnetic layer 24 function, for example, as oscillation layers. The first magnetic layer 21, the third magnetic layer 23, and the fifth magnetic layer 25 function, for example, as spin injection layers. In the magnetic head 121, the magnetization 22M of the second magnetic layer 22 and the magnetization 24M of the fourth magnetic layer 24 oscillate when, for example, the element current ic equal to or higher than the threshold value flows through the magnetic element 20. For example, the alternating magnetic field is generated.

In the magnetic head 121, for example, the component of the magnetization 23M of the third magnetic layer 23 along the first direction D1 is opposite to the component of the magnetization 21M of the first magnetic layer 21 along the first direction D1. The component of the magnetization 25M of the fifth magnetic layer 25 along the first direction D1 is in the same direction as the component of the magnetization 23M of the third magnetic layer 23 along the first direction D1.

In the magnetic head 121, for example, the second thickness t22 may be not less than 1.5 times and not more than 10 times the first thickness t21. The second thickness t22 may be not less than 1.5 times and not more than 10 times the third thickness t23. For example, the fourth thickness t24 may be not less than 1.5 times and not more than 10 times the fifth thickness t25.

In the magnetic head 121, for example, the first thickness t21 is not less than 0.5 nm and not more than 5 nm. For example, the second thickness t22 is not less than 4 nm and not more than 15 nm. For example, the third thickness t23 is not less than 0.5 nm and not more than 5 nm. For example, the fourth thickness t24 is not less than 4 nm and not more than 15 nm. For example, the fifth thickness t25 is not less than 0.5 nm and not more than 5 nm.

In the magnetic heads 120 and 121, the first non-magnetic layer thickness t41 may be, for example, not less than 1 nm and not more than 10 nm. The second non-magnetic layer thickness t42 may be, for example, not less than 0.5 nm and not more than 6 nm. The third non-magnetic layer thickness t43 may be, for example, not less than 0.5 nm and not more than 6 nm. The fourth non-magnetic layer thickness t44 may be, for example, not less than 1 nm and not more than 10 nm. The fifth non-magnetic layer thickness t45 may be, for example, not less than 0.5 nm and not more than 6 nm. The sixth non-magnetic layer thickness t46 may be, for example, not less than 1 nm and not more than 10 nm.

As shown in FIG. 2, when the magnetic head 120 is in operation, the element current ic equal to or higher than the threshold value is supplied to the magnetic element 20. The element current ic flows in the direction from the second magnetic pole 32 to the first magnetic pole 31, for example. An electron flow je corresponding to the element current ic flows in the direction from the first magnetic pole 31 to the second magnetic pole 32. The element current ic flows in the direction from the sixth non-magnetic layer 46 to the first non-magnetic layer 41.

An element voltage Ve1 is applied to the magnetic element 20 in the operation. In the example of FIG. 2, the potential of the first magnetic pole 31 is lower than the potential of the second magnetic pole 32.

The element current ic and the element voltage Ve1 are supplied by the element circuit 20D. For example, one end of the magnetic element 20 is electrically connected to the first magnetic pole 31. The other end of the magnetic element 20 is electrically connected to the second magnetic pole 32. The element circuit 20D is configured to apply the element voltage Ve1 between the first magnetic pole 31 and the second magnetic pole 32. The potential of the first magnetic pole 31 is lower than the potential of the second magnetic pole 32 when the element voltage Ve1 is applied.

In the example of FIG. 4, in the operation of the magnetic head 121, the element current ic flows in the direction from the second magnetic pole 32 to the first magnetic pole 31, for example. The potential of the first magnetic pole 31 is lower than the potential of the second magnetic pole 32 when the element voltage Ve1 is applied.

Figure 7:
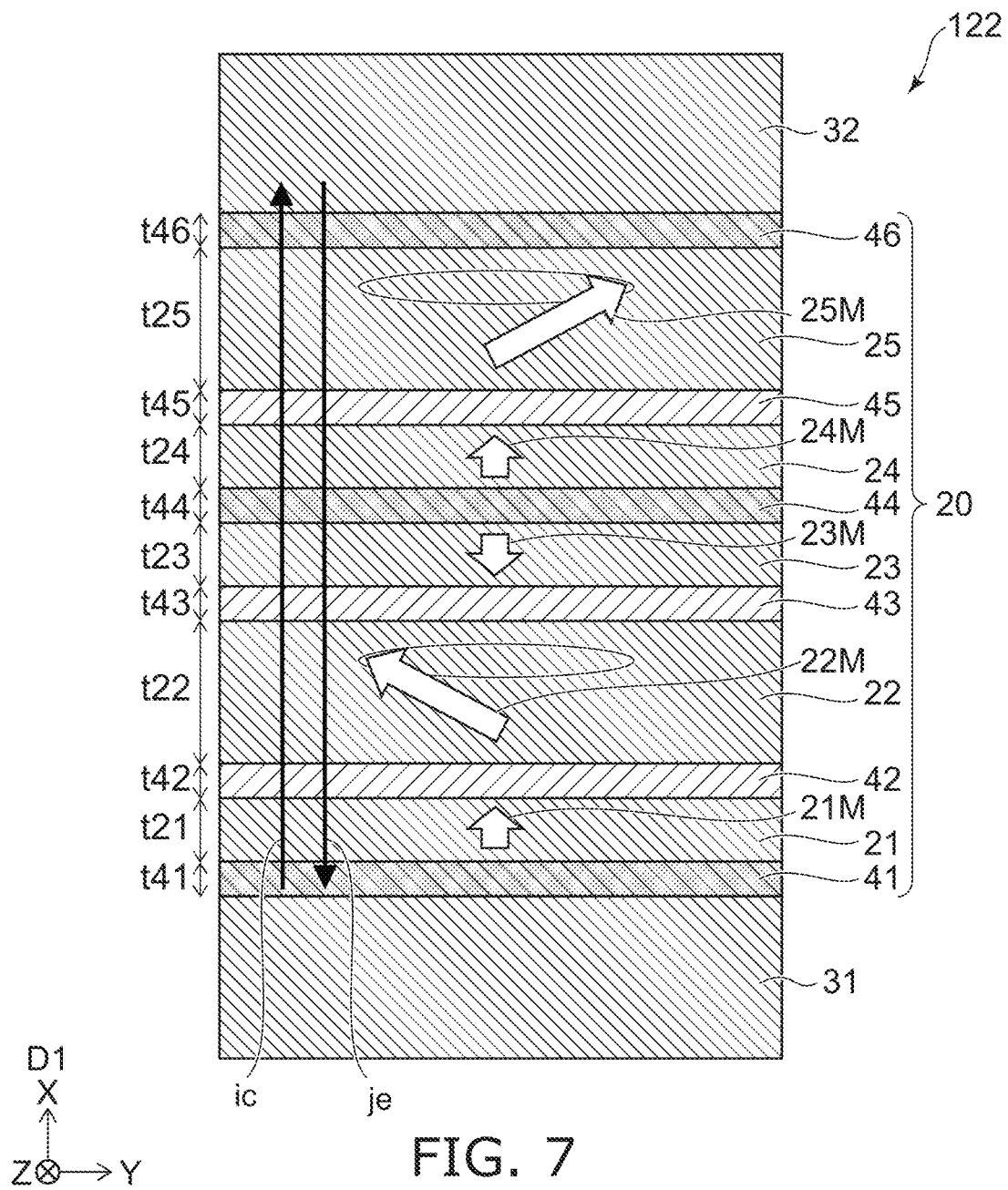
FIG. 7 is a schematic plan view illustrating a magnetic head according to the first embodiment.

FIG. 7 is a schematic plan view illustrating a magnetic head according to the first embodiment.

As shown in FIG. 7, in a magnetic head 122 according to the embodiment, the direction of the element current ic is opposite to the direction of the element current ic in the magnetic head 120. Characteristics similar to those of the magnetic head 121 are obtained in the magnetic head 122.

Figure 8:
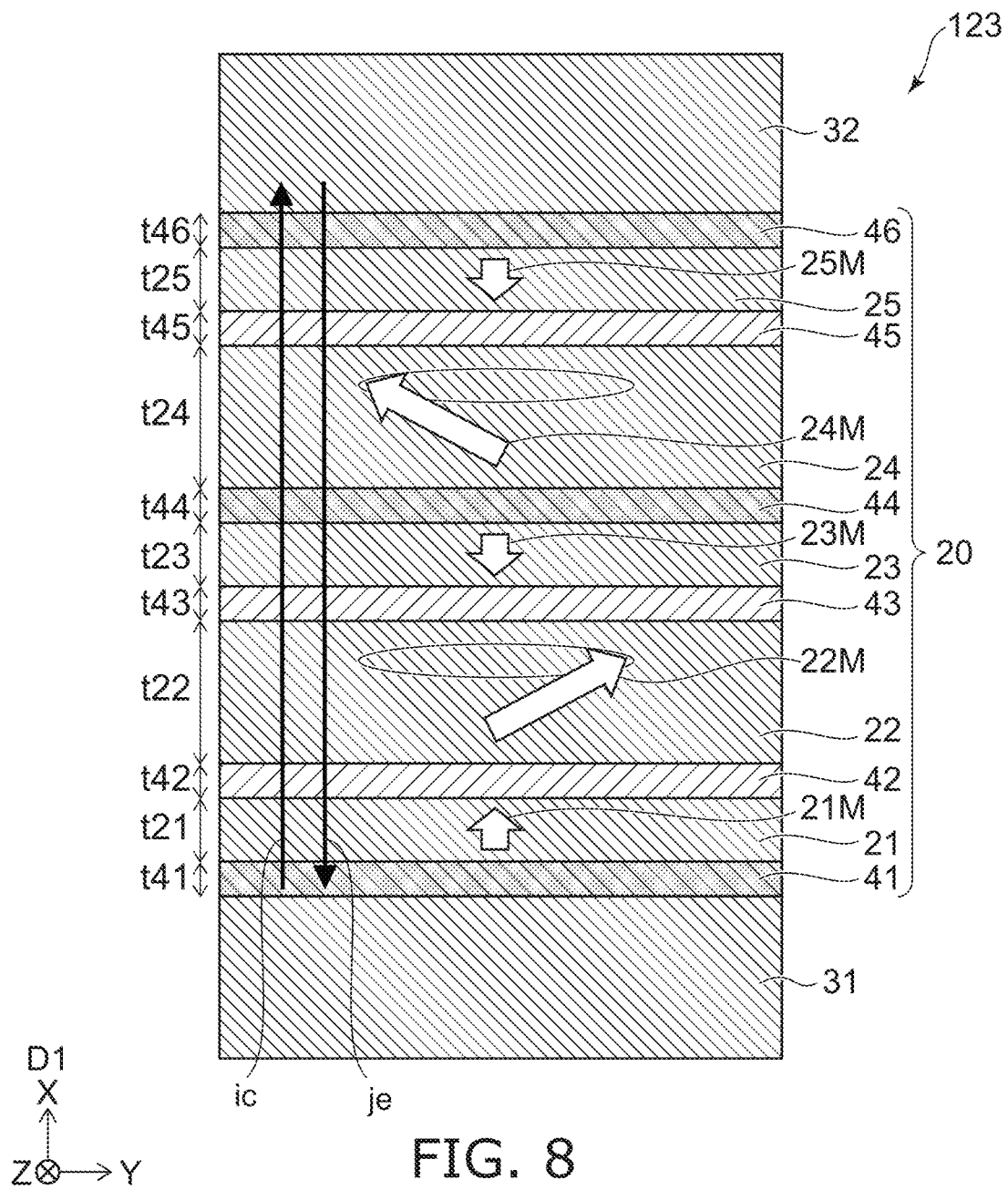
FIG. 8 is a schematic plan view illustrating a magnetic head according to the first embodiment.

FIG. 8 is a schematic plan view illustrating a magnetic head according to the first embodiment.

As shown in FIG. 8, in a magnetic head 123 according to the embodiment, the direction of the element current ic is opposite to the direction of the device current ic in the magnetic head 121. Characteristics similar to those of the magnetic head 120 are obtained in the magnetic head 123.

Figure 9:
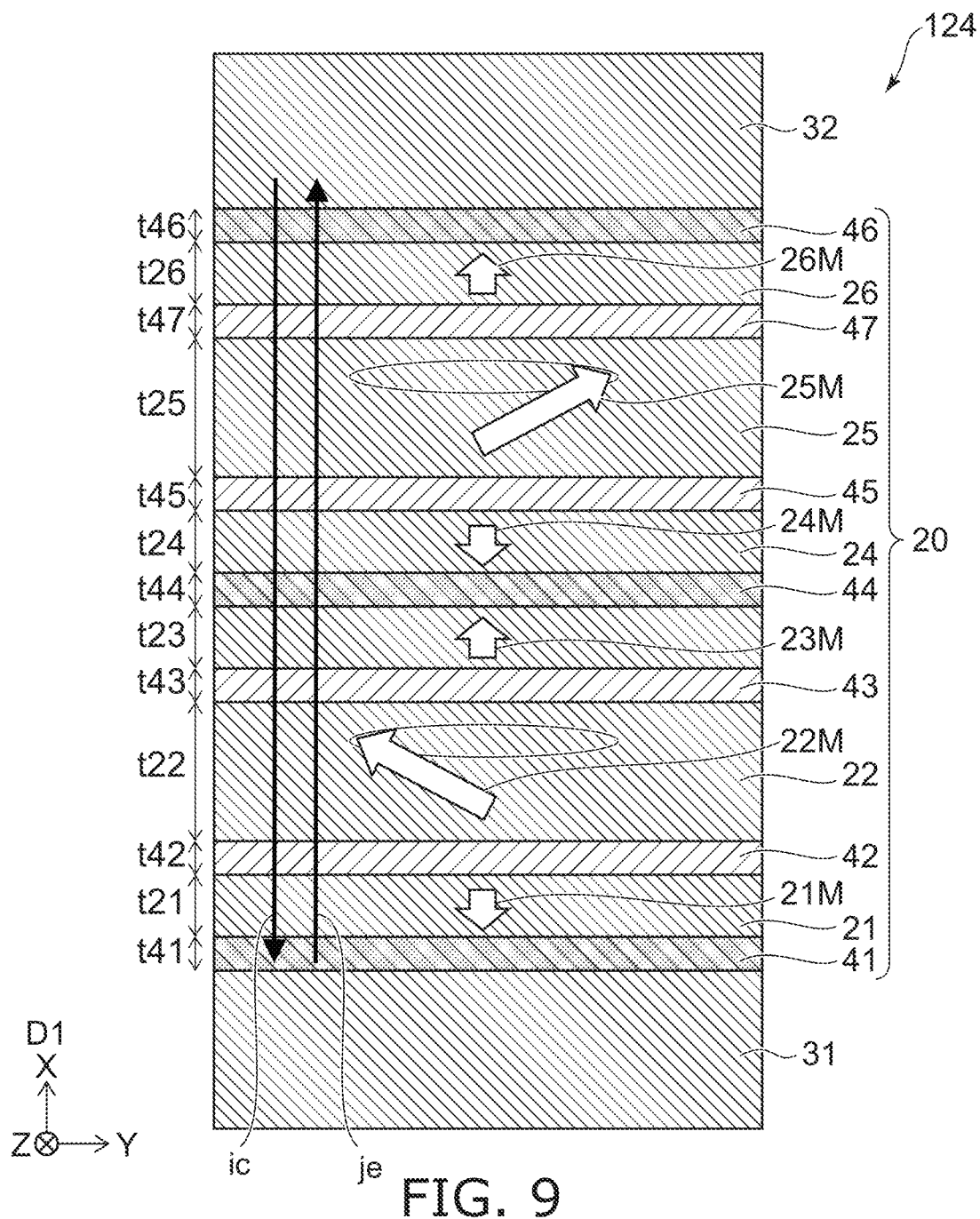
FIG. 9 is a schematic plan view illustrating a magnetic head according to the first embodiment.

FIG. 9 is a schematic plan view illustrating a magnetic head according to the first embodiment.

As shown in FIG. 9, in a magnetic head 124 according to the embodiment, the magnetic element 20 further includes a sixth magnetic layer 26 and a seventh non-magnetic layer 47. The sixth magnetic layer 26 is provided between the fifth magnetic layer 25 and the sixth non-magnetic layer 46. The seventh non-magnetic layer 47 is provided between the fifth magnetic layer 25 and the sixth magnetic layer 26. Except for this, the configuration of the magnetic head 124 may be the same as the configuration of the magnetic head 120.

Even in such a magnetic head 124, stable oscillation can be obtained even when the second magnetic pole 32 is unstable. In the magnetic head 124, the direction of the element current ic is from the first magnetic pole 31 to the second magnetic pole 32.

In the magnetic head 124, the seventh non-magnetic layer 47 includes at least one selected from the group consisting of Cu, Au, Cr, Al, V and Ag. The fifth thickness t25 of the fifth magnetic layer 25 in the first direction D1 is thicker than the fourth thickness t24 of the fourth magnetic layer 24 in the first direction D1. The fifth thickness t25 is thicker than the sixth thickness t26 of the sixth magnetic layer 26 in the first direction D1.

In the example of the magnetic head 124, the component of the magnetization 26M of the sixth magnetic layer 26 along the first direction D1 is, for example, opposite to the component of the magnetization of the fourth magnetic layer 24 along the first direction D1. In the magnetic head 124, the sixth magnetic layer 26 functions as a spin injection layer. The sixth magnetic layer 26 includes, for example, at least one selected from the group consisting of Fe, Co and Ni.

The sixth thickness t26 may be, for example, not less than 0.5 nm and not more than 5 nm. A seventh non-magnetic layer thickness t47 of the seventh non-magnetic layer 47 in the first direction D1 may be, for example, not less than 0.5 nm and not more than 6 nm.

In the magnetic head 124, the first non-magnetic layer 41 contacts the first magnetic pole 31 and the first magnetic layer 21. The second non-magnetic layer 42 contacts the first magnetic layer 21 and the second magnetic layer 22. The third non-magnetic layer 43 contacts the second magnetic layer 22 and the third magnetic layer 23. The fourth non-magnetic layer 44 contacts the third magnetic layer 23 and the fourth magnetic layer 24. The fifth non-magnetic layer 45 contacts the fourth magnetic layer 24 and the fifth magnetic layer 25. The seventh non-magnetic layer 47 contacts the fifth magnetic layer 25 and the sixth magnetic layer 26. The sixth non-magnetic layer 46 contacts the sixth magnetic layer 26 and the second magnetic pole 32.

Figure 10:
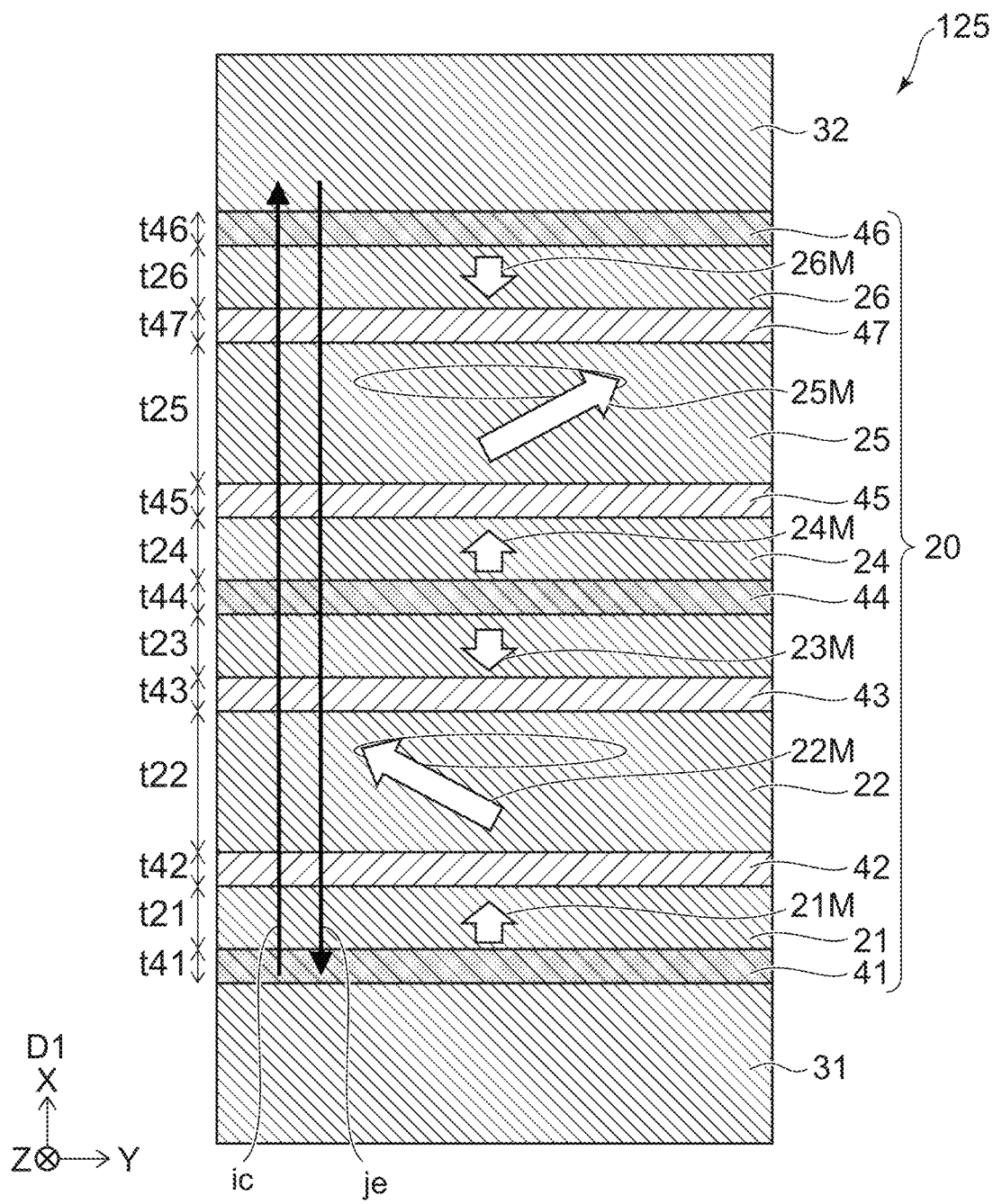
FIG. 10 is a schematic plan view illustrating a magnetic head according to the first embodiment.

FIG. 10 is a schematic plan view illustrating a magnetic head according to the first embodiment.

As shown in FIG. 10, in a magnetic head 125 according to the embodiment, the direction of the element current ic is opposite to the direction of the element current ic in the magnetic head 124. In the magnetic head 125, characteristics similar to those of the magnetic head 124 are obtained.

Figure 11:
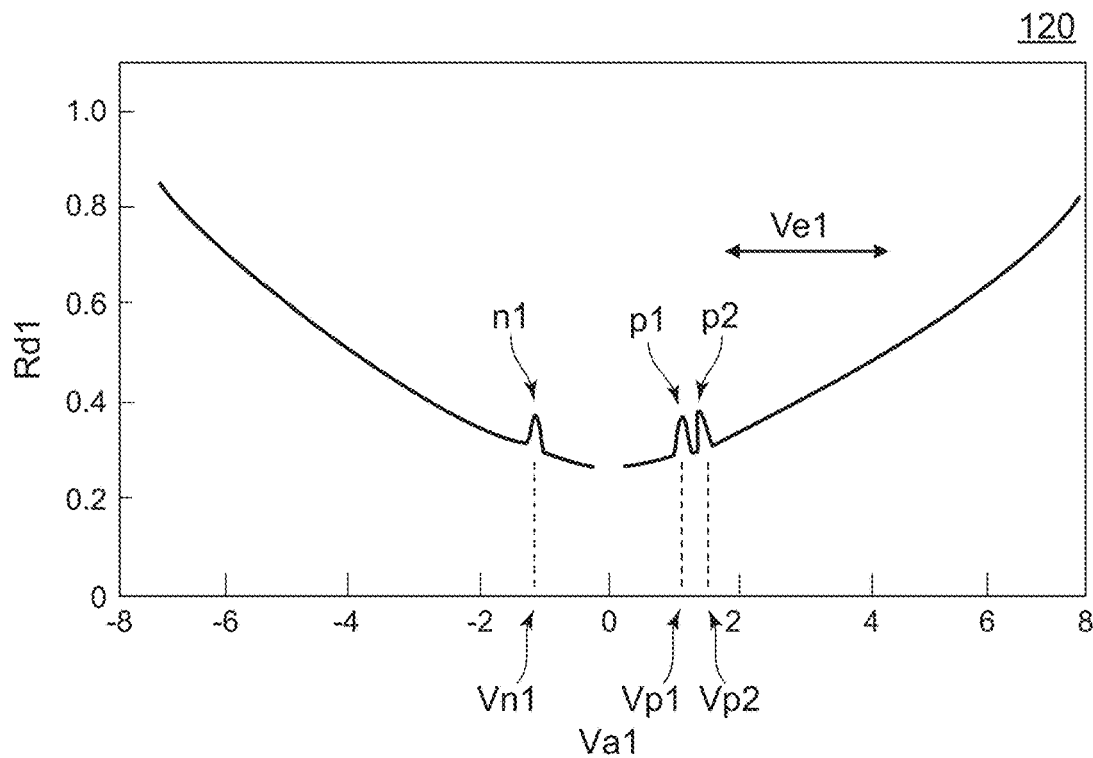
FIG. 11 is a graph illustrating characteristics of the magnetic head.

FIG. 11 is a graph illustrating characteristics of the magnetic head.

FIG. 11 corresponds to the magnetic head 120. FIG. 11 illustrates a differential electrical resistance of the magnetic element 20 when a voltage Va1 applied to the magnetic element 20 is changed. The horizontal axis is the voltage Va1. The vertical axis is the differential electrical resistance Rd1. The voltage Va1 may be the voltage between the first terminal T1 and the second terminal T2. For example, a voltage corresponding to voltage Va1 is applied to the magnetic element 20.

As shown in FIG. 11, the differential electrical resistance Rd1 when the voltage Va1 is changed includes three or more peaks. These peaks are considered to correspond to discontinuous changes in electrical resistance accompanying reversal of magnetization of the multiple magnetic layers included in the magnetic element 20.

The magnetic recording device 210 (see FIG. 3) includes a magnetic head according to the embodiment and a controller 75. The controller 75 includes an element circuit 20D. For example, one end of the magnetic element 20 is electrically connected to the first magnetic pole 31. The other end of the magnetic element 20 is electrically connected to the second magnetic pole 32.

As shown in FIG. 11, in the magnetic head 120, the differential electrical resistance Rd1 of the magnetic element 20 when the voltage Va1 between the first magnetic pole 31 and the second magnetic pole 32 is changed includes a first negative peak n1, a first positive peak p1 and a second positive peak p2. The voltage Va1 corresponding to the first negative peak n1 is defined as a first negative peak voltage Vn1. The voltage Va1 corresponding to the first positive peak p1 is defined as a first positive peak voltage Vp1. The voltage Va1 corresponding to the second positive peak p2 is defined as a second positive peak voltage Vp2.

The first negative peak voltage Vn1 is negative. The first positive peak voltage Vp1 and the second positive peak voltage Vp2 are positive. The potential of the first magnetic pole 31 is lower than the potential of the second magnetic pole 32 when the voltage Va1 is positive. The potential of the first magnetic pole 31 is higher than the potential of the second magnetic pole 32 when the voltage Va1 is negative.

The first positive peak voltage Vp1 is higher than the first negative peak voltage Vn1 and lower than the second positive peak voltage Vp2. In the magnetic head 120, the element voltage Ve1 (the absolute value of the element voltage Ve1) is equal to or higher than the second positive peak voltage Vp2. A stable and high-intensity oscillation can be obtained. The absolute value of the first negative peak voltage Vn1 may be greater than the second positive peak voltage Vp2.

Thus, the differential electrical resistance Rd1 includes three or more peaks (For example, the first peak, the second peak and the third peak). The "first peak" is, for example, a first negative peak n1. The "second peak" is, for example, the first positive peak p1. The "third peak" is, for example, the second positive peak p2. The first negative peak voltage Vn1 is, for example, a first voltage. The first positive peak voltage Vp1 is, for example, a second voltage. The second positive peak voltage Vp2 is, for example, a third voltage. The second voltage is between the first voltage and the third voltage. The element voltage Ve1 is not less than the third voltage.

Thus, the element voltage Ve1 may satisfy a first condition. In the first condition, the first voltage is negative. The second voltage, the third voltage and the element voltage Ve1 are positive. In the first condition, the element voltage Ve1 is not less than the third voltage.

In the magnetic head 120, for example, the absolute value of the element voltage Ve1 may be 10 times or less of the absolute value of the first positive peak voltage Vp1. For example, the absolute value of the element voltage Ve1 may be 8 times or less of the absolute value of the first positive peak voltage Vp1. For example, the absolute value of the element voltage Ve1 may be 10 times or less of the absolute value of the first negative peak voltage Vn1. For example, the absolute value of the element voltage Ve1 may be 8 times or less of the absolute value of the first negative peak voltage Vn1.

In the magnetic head 120, for example, the absolute value of the third voltage may be 4 times or less of the absolute value of the first positive peak voltage Vp1. For example, the absolute value of the third voltage may be three times or less of the absolute value of the first positive peak voltage Vp1. For example, the absolute value of the third voltage may be 4 times or less of the absolute value of the first negative peak voltage Vn1. For example, the absolute value of the third voltage may be 3 times or less of the absolute value of the first negative peak voltage Vn1.

In the magnetic head 120, the tail of the first positive peak p1 may overlap the second positive peak p2. The tail of the second positive peak p2 may overlap the first positive peak p1.

Figure 12:
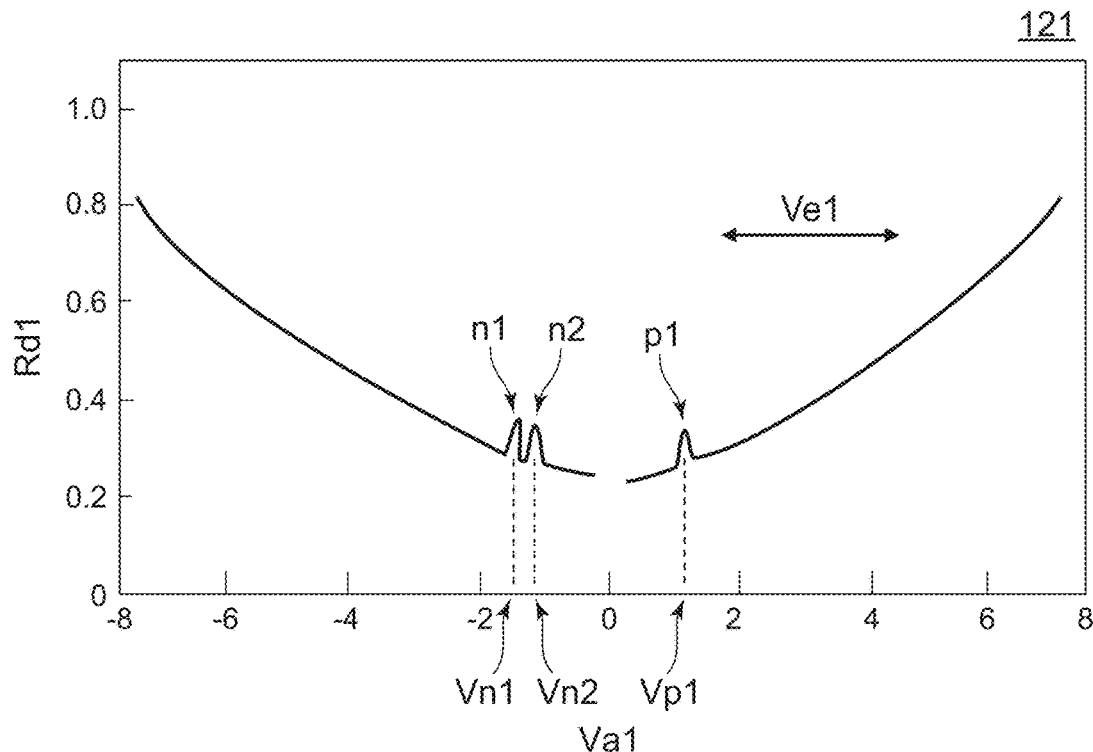
FIG. 12 is a graph illustrating characteristics of the magnetic head.

FIG. 12 is a graph illustrating characteristics of the magnetic head.

FIG. 12 corresponds to the magnetic head 121. As shown in FIG. 12, in the magnetic head 121, the differential electrical resistance Rd1 of the magnetic element 20 when the voltage Va1 is changed includes the first negative peak n1, a second negative peak n2 and the first positive peak p1. The voltage Va1 corresponding to the first negative peak n1 is defined as the first negative peak voltage Vn1. The voltage Va1 corresponding to the second negative peak n2 is defined as a second negative peak voltage Vn2. The voltage Va1 corresponding to the first positive peak p1 is defined as the first positive peak voltage Vp1.

The first negative peak voltage Vn1 and the second negative peak voltage Vn2 are negative. The first positive peak voltage Vp1 is positive. The second negative peak voltage Vn2 is higher than the first negative peak voltage Vn1 and lower than the first positive peak voltage Vp1. In the magnetic head 121, the element voltage Ve1 is equal to or higher than the first positive peak voltage Vp1. A stable and high-intensity oscillation can be obtained.

In the magnetic head 121, the "first peak" is, for example, the first negative peak n1. The "second peak" is, for example, the second negative peak n2. The "third peak" is, for example, the first positive peak p1. The first negative peak voltage Vn1 is, for example, a first voltage. The second negative peak voltage Vn2 is, for example, a second voltage. The first positive peak voltage Vp1 is, for example, a third voltage. The second voltage is between the first voltage and the third voltage. The element voltage Ve1 is not less than the third voltage.

Thus, the element voltage Ve1 may satisfy a second condition. In the second condition, the first voltage and the second voltage are negative. The third voltage and the element voltage are positive. In the third condition, the element voltage Ve1 is not less than the third voltage.

In the magnetic head 121, for example, the absolute value of the element voltage Ve1 may be 10 times or less the absolute value of the first positive peak voltage Vp1. The absolute value of the element voltage Ve1 may be 8 times or less the absolute value of the first positive peak voltage Vp1. In the magnetic head 121, for example, the absolute value of the element voltage Ve1 may be 10 times or less the absolute value of the second negative peak voltage Vn2. The absolute value of the element voltage Ve1 may be 8 times or less the absolute value of the second negative peak voltage Vn2.

In the magnetic head 121, for example, the absolute value of the third voltage may be 4 times or less the absolute value of the first negative peak voltage Vn1. For example, the absolute value of the third voltage may be 3 times or less the absolute value of the first negative peak voltage Vn1. For example, the absolute value of the third voltage may be 4 times or less the absolute value of the second negative peak voltage Vn2. For example, the absolute value of the third voltage may be 3 times or less the absolute value of the second negative peak voltage Vn2.

In the magnetic head 121, the tail of the first negative peak n1 may overlap the second negative peak n2. The tail of the second negative peak n2 may overlap the first negative peak n1.

Figure 13:
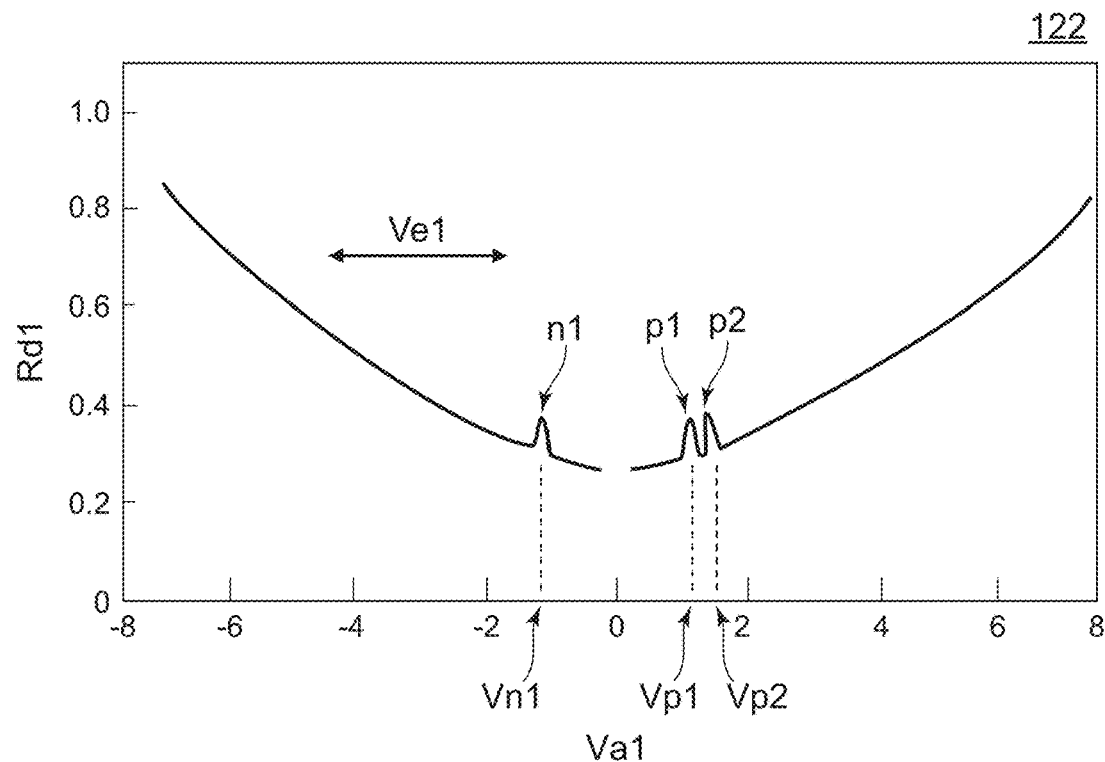
FIG. 13 is a graph illustrating characteristics of the magnetic head.

FIG. 13 is a graph illustrating characteristics of the magnetic head.

FIG. 13 corresponds to the magnetic head 122. As shown in FIG. 13, in the magnetic head 122, the differential electrical resistance Rd1 of the magnetic element 20 when the voltage Va1 is changed includes the first negative peak n1, the first positive peak p1 and the second positive peak p2. The first positive peak voltage Vp1 is higher than the first negative peak voltage Vn1 and lower than the second positive peak voltage Vp2. In the magnetic head 122, the absolute value of the element voltage Ve1 being negative is greater than or equal to the absolute value of the first negative peak voltage Vn1. A stable and high-intensity oscillation can be obtained. The absolute value of the first negative peak voltage Vn1 may be greater than the second positive peak voltage Vp2.

Thus, the differential electrical resistance Rd1 includes three or more peaks (For example, the first peak, the second peak and the third peak). The "first peak" is, for example, the first negative peak n1. The "second peak" is, for example, the first positive peak p1. The "third peak" is, for example, the second positive peak p2. The first negative peak voltage Vn1 is, for example, a first voltage. The first positive peak voltage Vp1 is, for example, a second voltage. The second positive peak voltage Vp2 is, for example, a third voltage. The second voltage is between the first voltage and the third voltage. The absolute value of the element voltage Ve1 being negative is not less than the absolute value of the first voltage.

Thus, the element voltage Ve1 may satisfy a third condition. In the third condition, the first voltage and the element voltage Ve1 are negative. The second voltage and the third voltage are positive. In the third condition, the absolute value of the element voltage Ve1 is equal to or greater than the absolute value of the first voltage.

In the magnetic head 122, for example, the absolute value of the element voltage Ve1 may be 10 times or less of the absolute value of the first negative peak voltage Vn1. For example, the absolute value of the element voltage Ve1 may be 8 times or less of the absolute value of the first negative peak voltage Vn1. For example, the absolute value of the element voltage Ve1 may be 10 times or less of the absolute value of the first positive peak voltage Vp1. For example, the absolute value of the element voltage Ve1 may be 8 times or less of the absolute value of the first positive peak voltage Vp1.

In the magnetic head 122, for example, the absolute value of the first voltage may be 4 times or less of the absolute value of the first positive peak voltage Vp1. For example, the absolute value of the first voltage may be 3 times or less of the absolute value of the first positive peak voltage Vp1. For example, the absolute value of the first voltage may be 4 times or less of the absolute value of the second positive peak voltage Vp2. For example, the absolute value of the first voltage may be three times or less of the absolute value of the second positive peak voltage Vp2.

Figure 14:
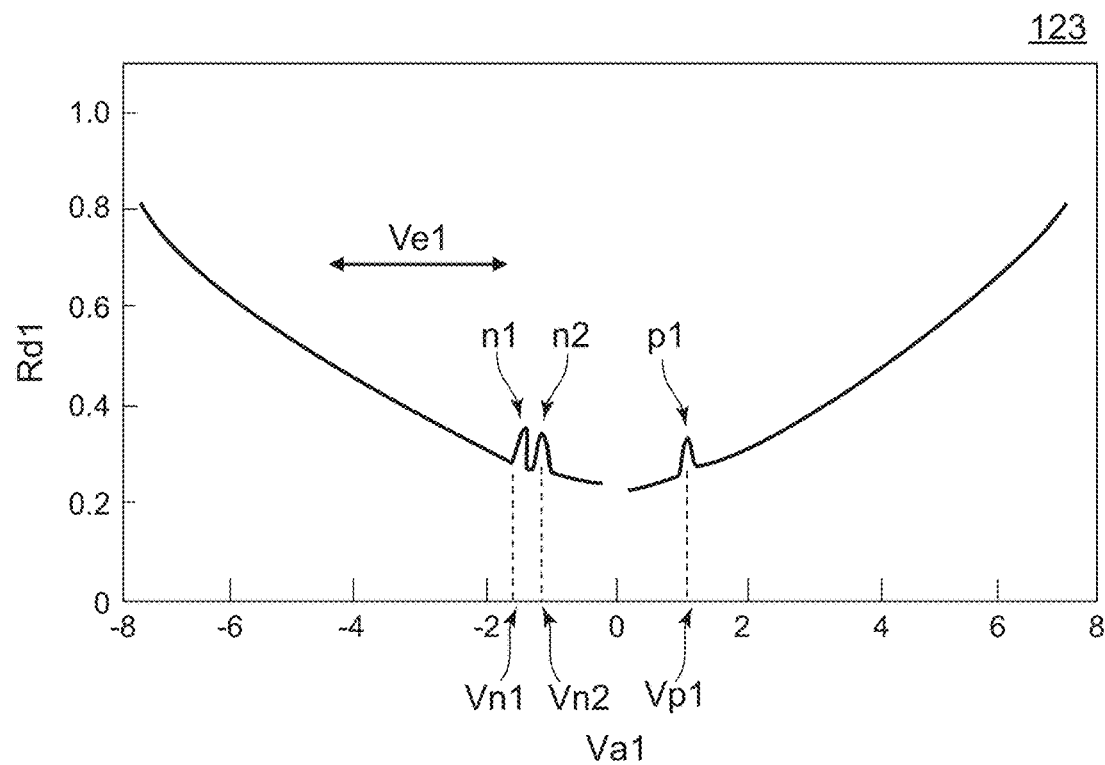
FIG. 14 is a graph illustrating characteristics of the magnetic head.

FIG. 14 is a graph illustrating characteristics of the magnetic head.

FIG. 14 corresponds to the magnetic head 123. As shown in FIG. 14, in the magnetic head 123, the differential electrical resistance Rd1 of the magnetic element 20 when the voltage Va1 is changed includes the first negative peak n1, the second negative peak n2 and the first positive peak p1. The voltage Va1 corresponding to the first negative peak n1 is the first negative peak voltage Vn1. The voltage Va1 corresponding to the second negative peak n2 is the second negative peak voltage Vn2. The voltage Va1 corresponding to the first positive peak p1 is the first positive peak voltage Vp1.

The first negative peak voltage Vn1 and the second negative peak voltage Vn2 are negative. The first positive peak voltage Vp1 is positive. The second negative peak voltage Vn2 is higher than the first negative peak voltage Vn1 and lower than the first positive peak voltage Vp1. In the magnetic head 123, the absolute value of the element voltage Ve1 being negative is greater than or equal to the absolute value of the negative first negative peak voltage Vn1. A stable and high-intensity oscillation can be obtained.

In the magnetic head 123, the "first peak" is, for example, the first negative peak n1. The "second peak" is, for example, the second negative peak n2. The "third peak" is, for example, the first positive peak p1. The first negative peak voltage Vn1 is, for example, a first voltage. The second negative peak voltage Vn2 is, for example, a second voltage. The first positive peak voltage Vp1 is, for example, a third voltage. The second voltage is between the first voltage and the third voltage. The absolute value of the element voltage Ve1 being negative is not less than the absolute value of the first voltage being negative.

Thus, the element voltage Ve1 may satisfy a fourth condition. In the fourth condition, the first voltage, the second voltage and the element voltage Ve1 are negative. The third voltage is positive. In the fourth condition, the absolute value of the element voltage Ve1 is greater than or equal to the absolute value of the first voltage.

In the magnetic head 123, for example, the absolute value of the element voltage Ve1 may be 10 times or less the absolute value of the second negative peak voltage Vn2. The absolute value of the element voltage Ve1 may be 8 times or less the absolute value of the second negative peak voltage Vn2. For example, the absolute value of the element voltage Ve1 may be 10 times or less the absolute value of the first positive peak voltage Vp1. The absolute value of the element voltage Ve1 may be 8 times or less the absolute value of the first positive peak voltage Vp1.

In the magnetic head 123, for example, the absolute value of the first voltage may be 4 times or less the absolute value of the first positive peak voltage Vp1. For example, the absolute value of the first voltage may be 3 times or less the absolute value of the first positive peak voltage Vp1. For example, the absolute value of the first voltage may be 4 times or less the absolute value of the second negative peak voltage Vn2. For example, the absolute value of the first voltage may be 3 times or less the absolute value of the second negative peak voltage Vn2.

In the magnetic head 123, the tail of the first negative peak n1 may overlap the second negative peak n2. The tail of the second negative peak n2 may overlap the first negative peak n1.

Figure 15:
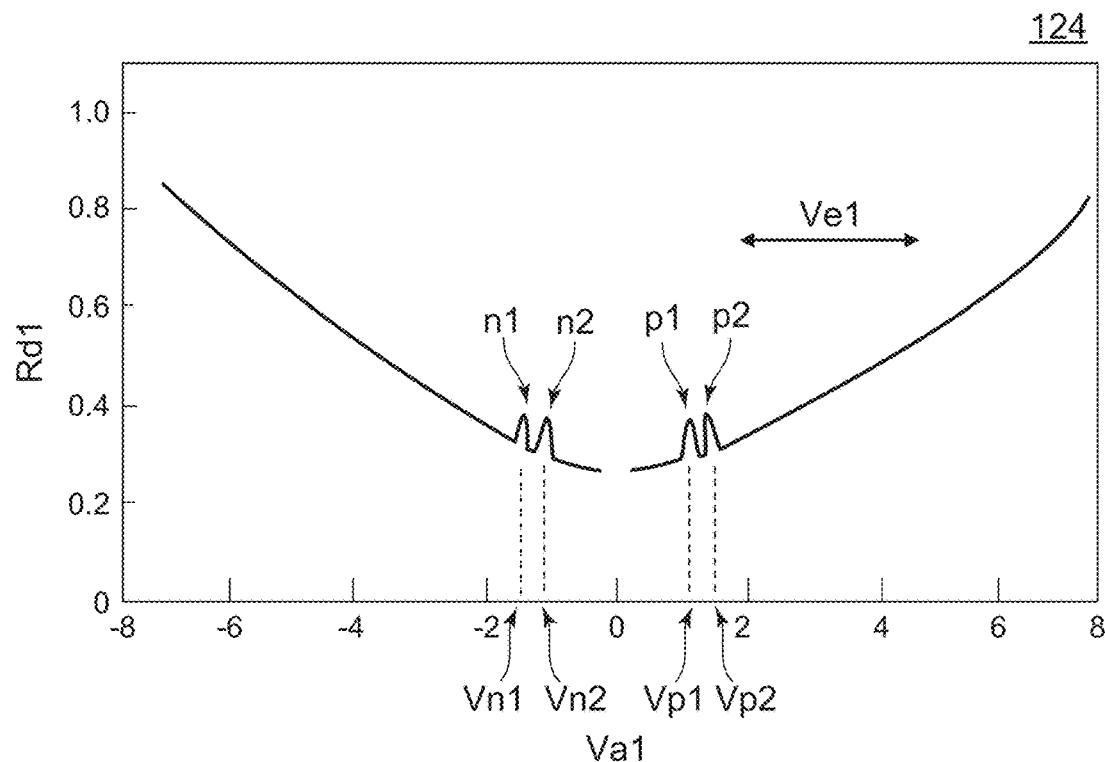
FIG. 15 is a graph illustrating characteristics of the magnetic head.

FIG. 15 is a graph illustrating characteristics of the magnetic head.

FIG. 15 corresponds to the magnetic head 124. As shown in FIG. 15, in the magnetic head 124, the differential electrical resistance Rd1 of the magnetic element 20 when the voltage Va1 is changed includes the first negative peak n1, the second negative peak n2, the first positive peak p1 and the second Includes positive peak p2. The voltage Va1 corresponding to the first negative peak n1 is the first negative peak voltage Vn1 being negative. The voltage Va1 corresponding to the second negative peak n2 is the second negative peak voltage Vn2 being negative. The voltage Va1 corresponding to the first positive peak p1 is the first positive peak voltage Vp1 being positive. The voltage Va1 corresponding to the second positive peak p2 is the second positive peak voltage Vp2 being positive. The second negative peak voltage Vn2 is between the first negative peak voltage Vn1 and the second positive peak voltage Vp2. The first positive peak voltage Vp1 is between the second negative peak voltage Vn2 and the second positive peak voltage Vp2.

The element voltage Ve1 satisfies a fifth condition. In the fifth condition, the element voltage Ve1 is positive. In the fifth condition, the element voltage Ve1 is equal to or higher than the second positive peak voltage Vp2. A stable and high-intensity oscillation can be obtained.

In the magnetic head 124, for example, the absolute value of the element voltage Ve1 may be 10 times or less the absolute value of the first positive peak voltage Vp1. The absolute value of the element voltage Ve1 may be 8 times or less the absolute value of the first positive peak voltage Vp1. For example, the absolute value of the element voltage Ve1 may be 10 times or less the absolute value of the second negative peak voltage Vn2. The absolute value of the element voltage Ve1 may be 8 times or less the absolute value of the second negative peak voltage Vn2.

In the magnetic head 124, for example, the absolute value of the second positive peak voltage Vp2 may be 4 times or less the absolute value of the first positive peak voltage Vp1. For example, the absolute value of the second positive peak voltage Vp2 may be 3 times or less the absolute value of the first positive peak voltage Vp1. For example, the absolute value of the second positive peak voltage Vp2 may be 4 times or less the absolute value of the second negative peak voltage Vn2. For example, the absolute value of the second positive peak voltage Vp2 may be 3 times or less the absolute value of the second negative peak voltage Vn2.

Figure 16:
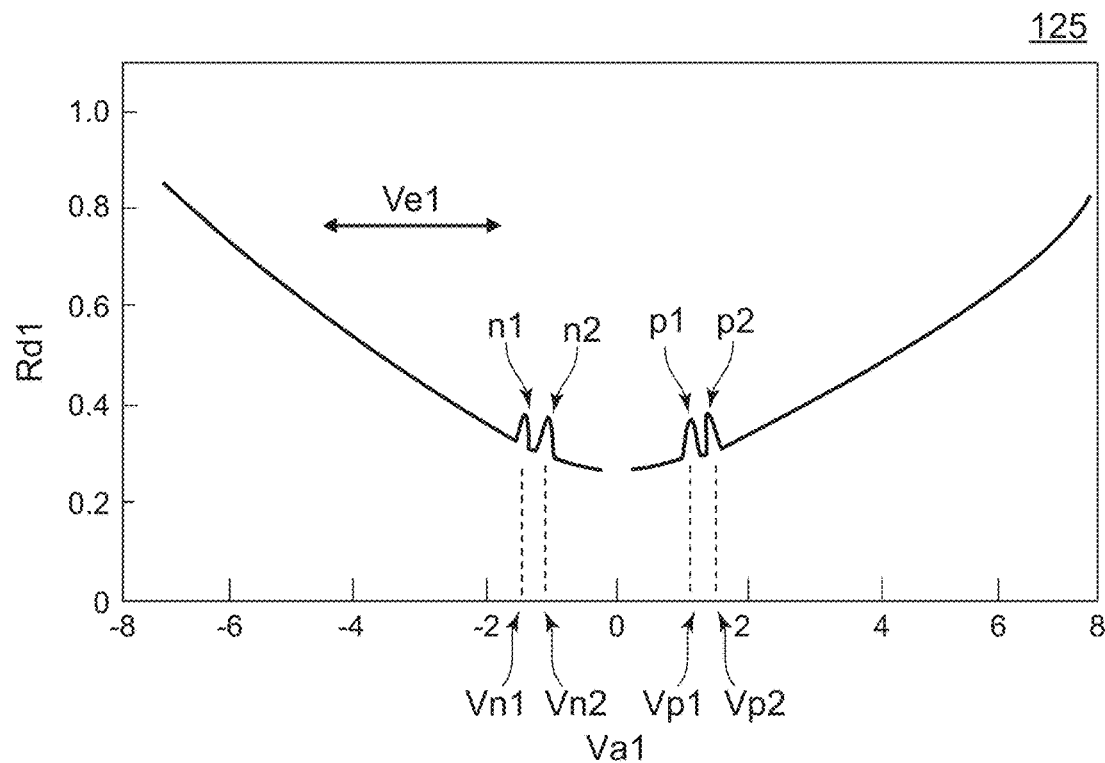
FIG. 16 is a graph illustrating characteristics of the magnetic head.

FIG. 16 is a graph illustrating characteristics of the magnetic head.

FIG. 16 corresponds to the magnetic head 125. As shown in FIG. 16, in the magnetic head 125, the differential electrical resistance Rd1 of the magnetic element 20 when the voltage Va1 is changed includes the first negative peak n1, the second negative peak n2, the first positive peak p1 and the second Includes positive peak p2. The voltage Va1 corresponding to the first negative peak n1 is the first negative peak voltage Vn1 being negative. The voltage Va1 corresponding to the second negative peak n2 is the second negative peak voltage Vn2 being negative. The voltage Va1 corresponding to the first positive peak p1 is the first positive peak voltage Vp1 being positive. The voltage Va1 corresponding to the second positive peak p2 is the second positive peak voltage Vp2 being positive.

The element voltage Ve1 satisfies a sixth condition. In the sixth condition, the element voltage Ve1 is negative. In the sixth condition, the absolute value of the element voltage Ve1 is greater than or equal to the absolute value of the first negative peak voltage Vn1. A stable and high-intensity oscillation can be obtained.

In the magnetic head 125, for example, the absolute value of the element voltage Ve1 may be 10 times or less the absolute value of the first positive peak voltage Vp1. The absolute value of the element voltage Ve1 may be 8 times or less the absolute value of the first positive peak voltage Vp1. For example, the absolute value of the element voltage Ve1 may be 10 times or less the absolute value of the second negative peak voltage Vn2. The absolute value of the element voltage Ve1 may be 8 times or less the absolute value of the second negative peak voltage Vn2.

In the magnetic head 125, for example, the absolute value of the first negative peak voltage Vn1 may be 4 times or less the absolute value of the first positive peak voltage Vp1. For example, the absolute value of the first negative peak voltage Vn1 may be 3 times or less the absolute value of the first positive peak voltage Vp1. For example, the absolute value of the first negative peak voltage Vn1 may be 4 times or less the absolute value of the second negative peak voltage Vn2. For example, the absolute value of the first negative peak voltage Vn1 may be 3 times or less the absolute value of the second negative peak voltage Vn2.

In the magnetic head 124 and the magnetic head 125, the tail of the first positive peak p1 may overlap the second positive peak p2. The tail of the second positive peak p2 may overlap the first positive peak p1. The tail of the first negative peak n1 may overlap the second negative peak n2. The tail of the second negative peak n2 may overlap the first negative peak n1.

In the embodiments, the first magnetic pole 31 may include a plurality of magnetic regions arranged along the X-axis direction. The second magnetic pole 32 may include a plurality of magnetic regions arranged along the X-axis direction. The boundaries between multiple magnetic regions may be clear or unclear. For example, the multiple magnetic regions are continuous.

Examples of other configurations of the magnetic recording device according to the embodiment will be described below. An example in which the magnetic head 120 is used will be described below. In the following description, the "magnetic head" may be any magnetic head (or any variation thereof) according to the embodiment.

Figure 17:
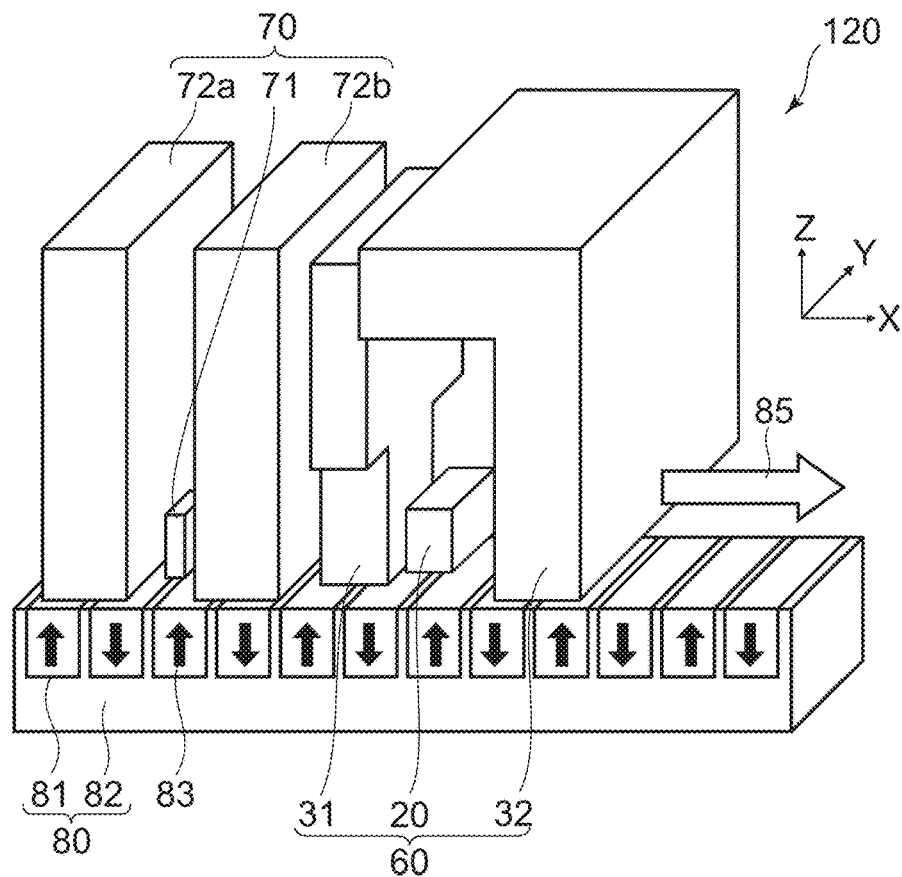
FIG. 17 is a schematic perspective view illustrating the magnetic recording device according to the embodiment.

FIG. 17 is a schematic perspective view illustrating the magnetic recording device according to the embodiment.

As shown in FIG. 17, the magnetic head (for example, the magnetic head 120) according to the embodiment is used together with the magnetic recording medium 80. In this example, the magnetic head 120 includes a recording section 60 and a reproducing section 70. Information is recorded on the magnetic recording medium 80 by the recording section 60 of the magnetic head 120. Information recorded on the magnetic recording medium 80 is reproduced by the reproducing section 70.

The magnetic recording medium 80 includes, for example, a medium substrate 82 and a magnetic recording layer 81 provided on the medium substrate 82. The magnetization 83 of the magnetic recording layer 81 is controlled by the recording section 60.

The reproducing section 70 includes, for example, a first reproducing magnetic shield 72a, a second reproducing magnetic shield 72b, and a magnetic reproducing element 71. The magnetic reproducing element 71 is provided between the first reproducing magnetic shield 72a and the second reproducing magnetic shield 72b. The magnetic reproducing element 71 is configured to output a signal corresponding to the magnetization 83 of the magnetic recording layer 81.

As shown in FIG. 17, the magnetic recording medium 80 moves relative to the magnetic head 120 in a direction of medium movement 85. Information corresponding to the magnetization 83 of the magnetic recording layer 81 is controlled at an arbitrary position by the magnetic head 120. Information corresponding to the magnetization 83 of the magnetic recording layer 81 is reproduced at an arbitrary position by the magnetic head 120.

Figure 18:
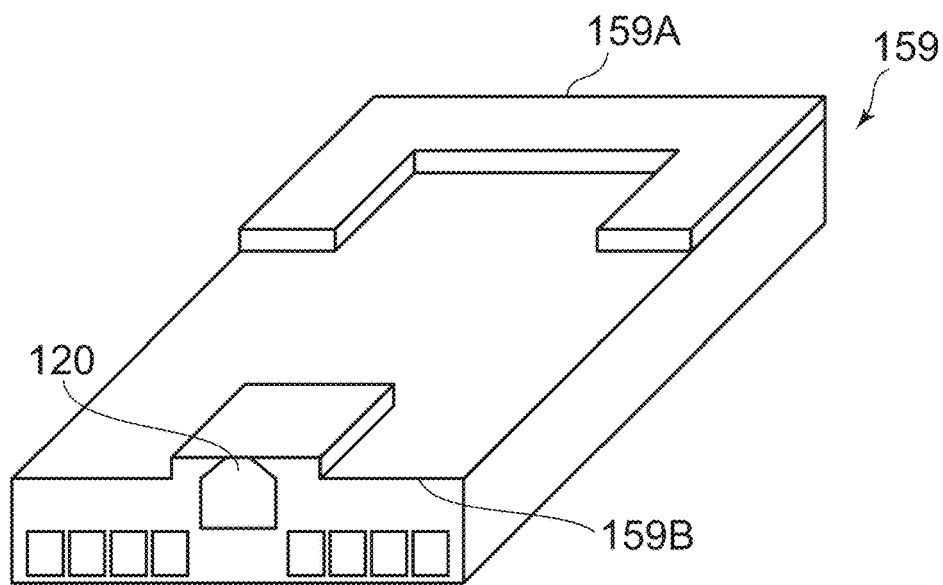
FIG. 18 is a schematic perspective view illustrating a part of the magnetic recording device according to the embodiment.

FIG. 18 is a schematic perspective view illustrating a part of the magnetic recording device according to the embodiment.

FIG. 18 illustrates a head slider.

The magnetic head 120 is provided on the head slider 159. The head slider 159 includes, for example, $Al_2O_3$/TiC or the like. The head slider 159 moves relative to the magnetic recording medium while floating or in contact with the magnetic recording medium.

The head slider 159 includes, for example, an air inflow side 159A and an air outflow side 159B. The magnetic head 120 is arranged on the side surface of the air outflow side 159B of the head slider 159 or the like. As a result, the magnetic head 120 moves relative to the magnetic recording medium while flying above or in contact with the magnetic recording medium.

Figure 19:
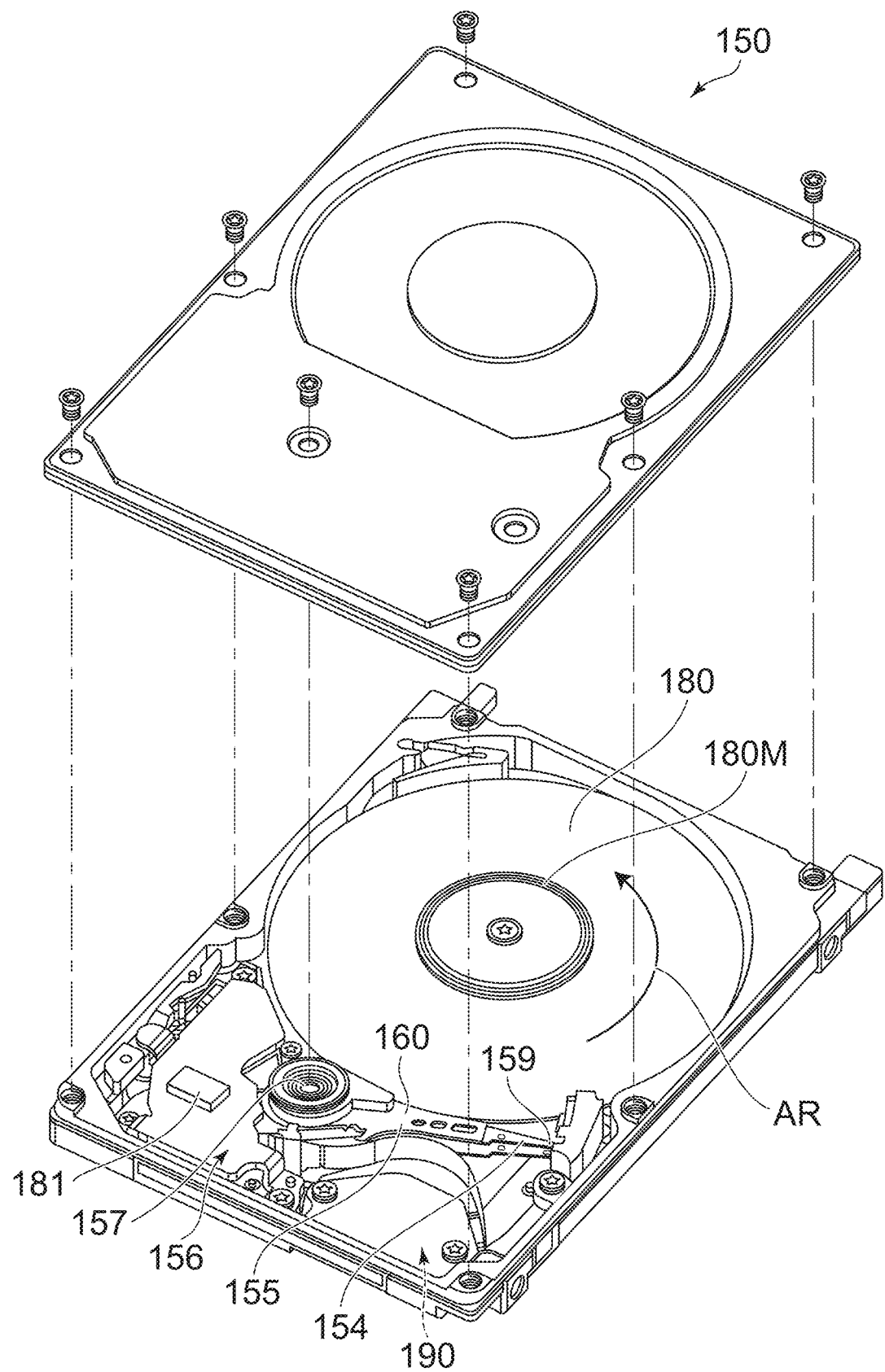
FIG. 19 is a schematic perspective view illustrating the magnetic recording device according to the embodiment.

FIG. 19 is a schematic perspective view illustrating the magnetic recording device according to the embodiment.

Figure 20A:
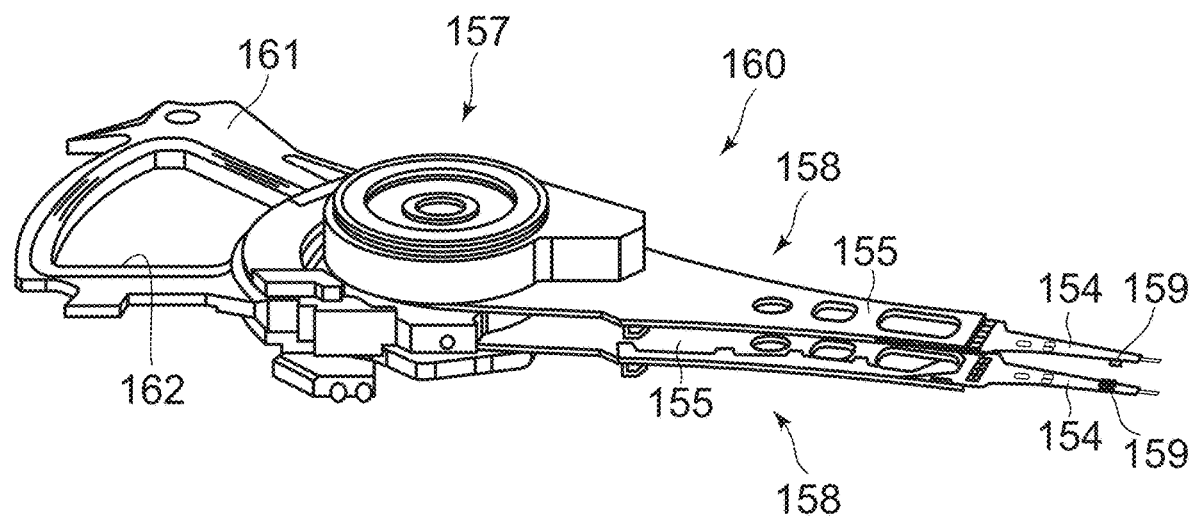
FIGS. 20A and 20B are schematic perspective views illustrating a part of the magnetic recording device according to the embodiment.
Figure 20B:
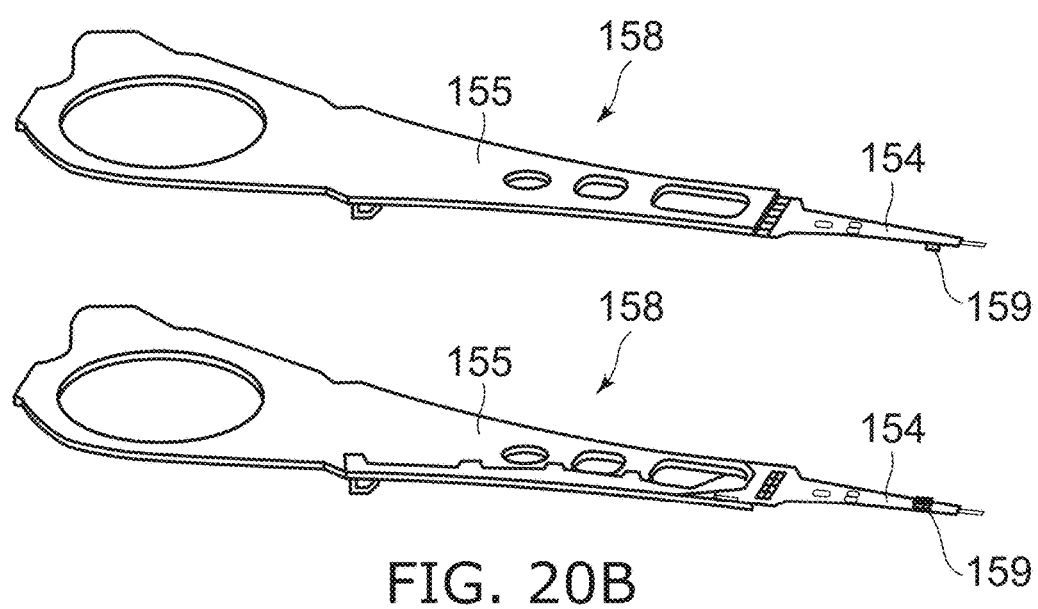

FIGS. 20A and 20B are schematic perspective views illustrating a part of the magnetic recording device according to the embodiment.

As shown in FIG. 19, in a magnetic recording device 150 according to the embodiment, a rotary actuator is used. The recording medium disk 180 is connected to a spindle motor 180M. The recording medium disk 180 is rotated in a direction of arrow AR by the spindle motor 180M. The spindle motor 180M is responsive to control signals from the drive device controller. The magnetic recording device 150 according to the embodiment may include the multiple recording medium disks 180. The magnetic recording device 150 may include a recording medium 181. The recording medium 181 is, for example, an SSD (Solid State Drive). A non-volatile memory such as a flash memory is used for the recording medium 181, for example. For example, the magnetic recording device 150 may be a hybrid HDD (Hard Disk Drive).

The head slider 159 records and reproduces information to be recorded on the recording medium disk 180. The head slider 159 is provided at an end of a thin-film suspension 154. A magnetic head according to the embodiment is provided near the end of the head slider 159.

While the recording medium disk 180 is rotating, the pressing pressure by the suspension 154 and the floating pressure generated at the medium facing surface (ABS) of the head slider 159 are balanced. The distance between the medium facing surface of the head slider 159 and the surface of the recording medium disk 180 is the predetermined fly height. In the embodiment, the head slider 159 may contact the recording medium disk 180. For example, a contact sliding type may be applied.

The suspension 154 is connected to one end of an arm 155 (e.g., an actuator arm). The arm 155 includes, for example, a bobbin part or the like. The bobbin part holds a drive coil. A voice coil motor 156 is provided at the other end of the arm 155. The voice coil motor 156 is a type of linear motor. The voice coil motor 156 includes, for example, a drive coil and a magnetic circuit. The drive coil is wound on the bobbin part of the arm 155. The magnetic circuit includes permanent magnets and opposing yokes. The drive coil is provided between the permanent magnet and the opposing yoke. The suspension 154 includes one end and the other end. The magnetic head is provided at one end of the suspension 154. The arm 155 is connected to the other end of the suspension 154.

The arm 155 is held by ball bearings. Ball bearings are provided at two locations above and below a bearing part 157. The arm 155 can be rotated and slid by the voice coil motor 156. The magnetic head can move to any position on the recording medium disk 180.

FIG. 20A is an enlarged perspective view of the head stack assembly 160, illustrating the configuration of a part of the magnetic recording device.

FIG. 20B is a perspective view illustrating the magnetic head assembly (head gimbal assembly: HGA) 158 that forms part of the head stack assembly 160.

As shown in FIG. 20A, the head stack assembly 160 includes the bearing part 157, the magnetic head assembly 158 and a support frame 161. The magnetic head assembly 158 extends from the bearing part 157. The support frame 161 extends from the bearing part 157. A direction in which the support frame 161 extends is opposite to a direction in which the magnetic head assembly 158 extends. The support frame 161 supports a coil 162 of the voice coil motor 156.

As shown in FIG. 20B, the magnetic head assembly 158 includes the arm 155 extending from the bearing part 157 and the suspension 154 extending from the arm 155.

The head slider 159 is provided at the end of the suspension 154. The head slider 159 is provided with the magnetic head according to the embodiment.

The magnetic head assembly 158 (head gimbal assembly) according to the embodiment includes the magnetic head according to the embodiment, the head slider 159 provided with the magnetic head, the suspension 154 and the arm 155. The head slider 159 is provided at one end of the suspension 154. The arm 155 is connected to the other end of the suspension 154.

The suspension 154 may include, for example, a wiring (not shown) for recording and reproducing signals. The suspension 154 may include, for example, a heater wiring (not shown) for adjusting the fly height. The suspension 154 may include a wiring (not shown) for, for example, an oscillator element or the like. These wires may be electrically connected to multiple electrodes provided on the magnetic head.

A signal processor 190 is provided in the magnetic recording device 150. The signal processor 190 uses a magnetic head to record and reproduce signals on a magnetic recording medium. Input/output lines of the signal processor 190 are connected to, for example, electrode pads of the magnetic head assembly 158 and electrically connected to the magnetic head.

The magnetic recording device 150 according to the embodiment includes the magnetic recording medium, the magnetic head according to the embodiment, a movable part, a position controller, and a signal processor. The movable part separates the magnetic recording medium from the magnetic head or makes them relatively movable while they are in contact with each other. The position controller aligns the magnetic head with a predetermined recording position on the magnetic recording medium. The signal processor records and reproduces signals on the magnetic recording medium using the magnetic head.

For example, the recording medium disk 180 is used as the above magnetic recording medium. The movable part includes, for example, the head slider 159. The position controller described above includes, for example, the magnetic head assembly 158.

The embodiments may include the following configurations (for example, technical proposals).

Configuration 1
A magnetic head, comprising:
a first magnetic pole;
a second magnetic pole; and
a magnetic element provided between the first magnetic pole and the second magnetic pole,
the magnetic element including
a first magnetic layer,
a second magnetic layer provided between the first magnetic layer and the second magnetic pole,
a third magnetic layer provided between the second magnetic layer and the second magnetic pole,
a fourth magnetic layer provided between the third magnetic layer and the second magnetic pole,
a fifth magnetic layer provided between the fourth magnetic layer and the second magnetic pole,
a first non-magnetic layer provided between the first magnetic pole and the first magnetic layer,
a second non-magnetic layer provided between the first magnetic layer and the second magnetic layer,
a third non-magnetic layer provided between the second magnetic layer and the third magnetic layer,
a fourth non-magnetic layer provided between the third magnetic layer and the fourth magnetic layer,
a fifth non-magnetic layer provided between the fourth magnetic layer and the fifth magnetic layer, and
a sixth non-magnetic layer provided between the fifth magnetic layer and the second magnetic pole,
the sixth non-magnetic layer including at least one selected from the group consisting of Ru, Ir, Ta, Rh, Pd, Pt and W.

Configuration 2
The magnetic head according to Configuration 1, wherein
the first non-magnetic layer includes at least one selected from the group consisting of Ru, Ir, Ta, Rh, Pd, Pt and W, and
the fourth non-magnetic layer includes at least one selected from the group consisting of Ru, Ir, Ta, Rh, Pd, Pt and W.

Configuration 3
The magnetic head according to Configuration 2, wherein
the second non-magnetic layer includes at least one selected from the group consisting of Cu, Au, Cr, Al, V and Ag,
the third non-magnetic layer includes at least one selected from the group consisting of Cu, Au, Cr, Al, V and Ag, and
the fifth non-magnetic layer includes at least one selected from the group consisting of Cu, Au, Cr, Al, V and Ag.

Configuration 4
The magnetic head according to Configuration 3, wherein
a second thickness of the second magnetic layer in a first direction from the first magnetic pole to the second magnetic pole is thicker than a first thickness of the first magnetic layer in the first direction, and
the second thickness is thicker than a third thickness of the third magnetic layer in the first direction.

Configuration 5
The magnetic head according to Configuration 4, wherein
a fourth thickness of the fourth magnetic layer in the first direction is thinner than a fifth thickness of the fifth magnetic layer in the first direction.

Configuration 6
The magnetic head according to Configuration 4, wherein
a fourth thickness of the fourth magnetic layer in the first direction is thicker than a fifth thickness of the fifth magnetic layer in the first direction.

Configuration 7
The magnetic head according to Configuration 4, wherein
the magnetic element further includes:
a sixth magnetic layer, and
a seventh non-magnetic layer,
the sixth magnetic layer is provided between the fifth magnetic layer and the sixth non-magnetic layer, and
the seventh non-magnetic layer is provided between the fifth magnetic layer and the sixth magnetic layer.

Configuration 8
The magnetic head according to Configuration 7, wherein
the seventh non-magnetic layer includes at least one selected from the group consisting of Cu, Au, Cr, Al, V and Ag,
a fifth thickness of the fifth magnetic layer in the first direction is thicker than a fourth thickness of the fourth magnetic layer in the first direction, and
the fifth thickness is thicker than a sixth thickness of the sixth magnetic layer in the first direction.

Configuration 9
The magnetic head according to Configuration 8, wherein
the first non-magnetic layer contacts the first magnetic pole and the first magnetic layer,
the second non-magnetic layer contacts the first magnetic layer and the second magnetic layer,
the third non-magnetic layer contacts the second magnetic layer and the third magnetic layer, the fourth non-magnetic layer contacts the third magnetic layer and the fourth magnetic layer, the fifth non-magnetic layer contacts the fourth magnetic layer and the fifth magnetic layer, the seventh non-magnetic layer contacts the fifth magnetic layer and the sixth magnetic layer, and the sixth non-magnetic layer contacts the sixth magnetic layer and the second magnetic pole.

Configuration 10

The magnetic head according to Configuration 4, wherein the first non-magnetic layer contacts the first magnetic pole and the first magnetic layer, the second non-magnetic layer contacts the first magnetic layer and the second magnetic layer, the third non-magnetic layer contacts the second magnetic layer and the third magnetic layer, the fourth non-magnetic layer contacts the third magnetic layer and the fourth magnetic layer, the fifth non-magnetic layer contacts the fourth magnetic layer and the fifth magnetic layer, and the sixth non-magnetic layer contacts the fifth magnetic layer and the second magnetic pole.

Configuration 11

The magnetic head according to any one of Configurations 1-10, wherein one end of the magnetic element is electrically connected to the first magnetic pole, another end of the magnetic element is electrically connected to the second magnetic pole, and a differential electrical resistance of the magnetic element when a voltage between the first magnetic pole and the second magnetic pole is changed includes 3 or more peaks.

Configuration 12

A magnetic recording device, comprising:

the magnetic head according to any one of Configurations 1-6; and a controller including an element circuit, one end of the magnetic element being electrically connected to the first magnetic pole, another end of the magnetic element being electrically connected to the second magnetic pole, and the element circuit being configured to apply an element voltage between the first magnetic pole and the second magnetic pole.

Configuration 13

The magnetic recording device according to Configuration 12, wherein a differential electric resistance of the magnetic element when a voltage between the first magnetic pole and the second magnetic pole is changed includes a first peak, a second peak and a third peak, when the voltage is positive, a potential of the first magnetic pole is lower than a potential of the second magnetic pole, when the voltage is negative, the potential of the first magnetic pole is higher than the potential of the second magnetic pole, the voltage corresponding to the first peak is a first voltage, the voltage corresponding to the second peak is a second voltage, the voltage corresponding to the third peak is a third voltage, the second voltage is between the first voltage and the third voltage, the element voltage satisfies one of the first condition, the second condition, the third condition and the fourth condition, in the first condition, the first voltage is negative, the second voltage, the third voltage and the element voltage are positive, and the element voltage is equal to or higher than the third voltage, in the second condition, the first voltage and the second voltage are negative, the third voltage and the element voltage are positive, and the element voltage is equal to or higher than the third voltage, in the third condition, the first voltage and the element voltage are negative, the second voltage and the third voltage are positive, and the absolute value of the element voltage is equal to or greater than the absolute value of the first voltage, and in the fourth condition, the first voltage, the second voltage, and the element voltage are negative, the third voltage is positive, and the absolute value of the element voltage is equal to or greater than the first voltage.

Configuration 14

A magnetic recording device, comprising:

the magnetic head according to any one of Configurations 7-10; and a controller including an element circuit, one end of the magnetic element being electrically connected to the first magnetic pole, another end of the magnetic element being electrically connected to the second magnetic pole, and the element circuit being configured to apply an element voltage between the first magnetic pole and the second magnetic pole.

Configuration 15

The magnetic recording device according to Configuration 14, wherein a differential electric resistance of the magnetic element when a voltage between the first magnetic pole and the second magnetic pole is changed includes a first negative peak, a second negative peak, a first positive peak and a second positive peak, when the voltage is positive, a potential of the first magnetic pole is lower than a potential of the second magnetic pole, when the voltage is negative, the potential of the first magnetic pole is higher than the potential of the second magnetic pole, the voltage corresponding to the first negative peak is a first negative peak voltage being negative, the voltage corresponding to the second negative peak is a second negative peak voltage being negative, the voltage corresponding to the first positive peak is a first positive peak voltage being positive, the voltage corresponding to the second positive peak is a second positive peak voltage being positive, the second negative peak voltage is between the first negative peak voltage and the second positive peak voltage, the first positive peak voltage is between the second negative peak voltage and the second positive peak voltage, the element voltage satisfies one of the fifth condition and the sixth condition, in the fifth condition, the element voltage is positive, the element voltage is equal to or higher than the second positive peak voltage, and in the sixth condition, the element voltage is negative, and the absolute value of the element voltage is greater than or equal to the absolute value of the first negative peak voltage.

According to the embodiments, it is possible to provide a magnetic head and a magnetic recording device capable of improving the recording density.

In the specification of the application, "perpendicular" and "parallel" refer to not only strictly perpendicular and strictly parallel but also include, for example, the fluctuation due to manufacturing processes, etc. It is sufficient to be substantially perpendicular and substantially parallel.

Hereinabove, exemplary embodiments of the invention are described with reference to specific examples. However, the embodiments of the invention are not limited to these specific examples. For example, one skilled in the art may similarly practice the invention by appropriately selecting specific configurations of components included in magnetic heads and magnetic recording devices such as magnetic poles, magnetic elements, magnetic layers, non-magnetic layers, terminals, controllers, etc., from known art. Such practice is included in the scope of the invention to the extent that similar effects thereto are obtained.

Further, any two or more components of the specific examples may be combined within the extent of technical feasibility and are included in the scope of the invention to the extent that the purport of the invention is included.

Moreover, all magnetic heads and magnetic recording devices practicable by an appropriate design modification by one skilled in the art based on the magnetic heads and the magnetic recording devices described above as embodiments of the invention also are within the scope of the invention to the extent that the purport of the invention is included.

Various other variations and modifications can be conceived by those skilled in the art within the spirit of the invention, and it is understood that such variations and modifications are also encompassed within the scope of the invention.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:

1. A magnetic head, comprising:
a first magnetic pole;
a second magnetic pole; and
a magnetic element provided between the first magnetic pole and the second magnetic pole,
the magnetic element including
a first magnetic layer,
a second magnetic layer provided between the first magnetic layer and the second magnetic pole,
a third magnetic layer provided between the second magnetic layer and the second magnetic pole,
a fourth magnetic layer provided between the third magnetic layer and the second magnetic pole,
a fifth magnetic layer provided between the fourth magnetic layer and the second magnetic pole,
a first non-magnetic layer provided between the first magnetic pole and the first magnetic layer,
a second non-magnetic layer provided between the first magnetic layer and the second magnetic layer,
a third non-magnetic layer provided between the second magnetic layer and the third magnetic layer,
a fourth non-magnetic layer provided between the third magnetic layer and the fourth magnetic layer,
a fifth non-magnetic layer provided between the fourth magnetic layer and the fifth magnetic layer, and
a sixth non-magnetic layer provided between the fifth magnetic layer and the second magnetic pole,
the sixth non-magnetic layer including at least one selected from the group consisting of Ru, Ir, Ta, Rh, Pd, Pt and W,
wherein
the first non-magnetic layer includes at least one selected from the group consisting of Ru, Ir, Ta, Rh, Pd, Pt and W,
the fourth non-magnetic layer includes at least one selected from the group consisting of Ru, Ir, Ta, Rh, Pd, Pt and W,
the second non-magnetic layer includes at least one selected from the group consisting of Cu, Au, Cr, Al, V and Ag,
the third non-magnetic layer includes at least one selected from the group consisting of Cu, Au, Cr, Al, V and Ag,
the fifth non-magnetic layer includes at least one selected from the group consisting of Cu, Au, Cr, Al, V and Ag,
a second thickness of the second magnetic layer in a first direction from the first magnetic pole to the second magnetic pole is thicker than a first thickness of the first magnetic layer in the first direction,
the second thickness is thicker than a third thickness of the third magnetic layer in the first direction,
a fourth thickness of the fourth magnetic layer in the first direction is thinner than a fifth thickness of the fifth magnetic layer in the first direction,
the first magnetic layer directly contacts the first non-magnetic layer and the second non-magnetic layer,
the second magnetic layer directly contacts the second non-magnetic layer and the third non-magnetic layer,
the third magnetic layer directly contacts the third non-magnetic layer and the fourth non-magnetic layer,
the fourth magnetic layer directly contacts the fourth non-magnetic layer and the fifth non-magnetic layer, and
the fifth magnetic layer directly contacts the fifth non-magnetic layer and the sixth non-magnetic layer.

2. The magnetic head according to claim 1, wherein
the first non-magnetic layer contacts the first magnetic pole and the first magnetic layer,
the second non-magnetic layer contacts the first magnetic layer and the second magnetic layer,
the third non-magnetic layer contacts the second magnetic layer and the third magnetic layer,
the fourth non-magnetic layer contacts the third magnetic layer and the fourth magnetic layer,
the fifth non-magnetic layer contacts the fourth magnetic layer and the fifth magnetic layer, and
the sixth non-magnetic layer contacts the fifth magnetic layer and the second magnetic pole.

3. A magnetic recording device, comprising:
the magnetic head according to claim 1; and
a controller including an element circuit,
one end of the magnetic element being electrically connected to the first magnetic pole, another end of the magnetic element being electrically connected to the second magnetic pole, and the element circuit being configured to apply an element voltage between the first magnetic pole and the second magnetic pole.

4. The magnetic recording device according to claim 3, wherein a differential electric resistance of the magnetic element when a voltage between the first magnetic pole and the second magnetic pole is changed includes a first peak, a second peak and a third peak, when the voltage is positive, a potential of the first magnetic pole is lower than a potential of the second magnetic pole, when the voltage is negative, the potential of the first magnetic pole is higher than the potential of the second magnetic pole, the voltage corresponding to the first peak is a first voltage, the voltage corresponding to the second peak is a second voltage, the voltage corresponding to the third peak is a third voltage, the second voltage is between the first voltage and the third voltage, the element voltage satisfies one of a first condition, a second condition, a third condition and a fourth condition, in the first condition, the first voltage is negative, the second voltage, the third voltage and the element voltage are positive, and the element voltage is equal to or higher than the third voltage, in the second condition, the first voltage and the second voltage are negative, the third voltage and the element voltage are positive, and the element voltage is equal to or higher than the third voltage, in the third condition, the first voltage and the element voltage are negative, the second voltage and the third voltage are positive, and the absolute value of the element voltage is equal to or greater than the absolute value of the first voltage, and in the fourth condition, the first voltage, the second voltage, and the element voltage are negative, the third voltage is positive, and the absolute value of the element voltage is equal to or greater than the first voltage.

5. A magnetic head, comprising:
a first magnetic pole;
a second magnetic pole; and
a magnetic element provided between the first magnetic pole and the second magnetic pole,
the magnetic element including
a first magnetic layer,
a second magnetic layer provided between the first magnetic layer and the second magnetic pole,
a third magnetic layer provided between the second magnetic layer and the second magnetic pole,
a fourth magnetic layer provided between the third magnetic layer and the second magnetic pole,
a fifth magnetic layer provided between the fourth magnetic layer and the second magnetic pole,
a first non-magnetic layer provided between the first magnetic pole and the first magnetic layer,
a second non-magnetic layer provided between the first magnetic layer and the second magnetic layer,
a third non-magnetic layer provided between the second magnetic layer and the third magnetic layer,
a fourth non-magnetic layer provided between the third magnetic layer and the fourth magnetic layer,
a fifth non-magnetic layer provided between the fourth magnetic layer and the fifth magnetic layer, and
a sixth non-magnetic layer provided between the fifth magnetic layer and the second magnetic pole,
the sixth non-magnetic layer including at least one selected from the group consisting of Ru, Ir, Ta, Rh, Pd, Pt and W,
wherein
the first non-magnetic layer includes at least one selected from the group consisting of Ru, Ir, Ta, Rh, Pd, Pt and W,
the fourth non-magnetic layer includes at least one selected from the group consisting of Ru, Ir, Ta, Rh, Pd, Pt and W,
the second non-magnetic layer includes at least one selected from the group consisting of Cu, Au, Cr, Al, V and Ag,
the third non-magnetic layer includes at least one selected from the group consisting of Cu, Au, Cr, Al, V and Ag,
the fifth non-magnetic layer includes at least one selected from the group consisting of Cu, Au, Cr, Al, V and Ag,
a second thickness of the second magnetic layer in a first direction from the first magnetic pole to the second magnetic pole is thicker than a first thickness of the first magnetic layer in the first direction,
the second thickness is thicker than a third thickness of the third magnetic layer in the first direction,
the magnetic element further includes:
a sixth magnetic layer, and
a seventh non-magnetic layer,
the sixth magnetic layer is provided between the fifth magnetic layer and the sixth non-magnetic layer, and
the seventh non-magnetic layer is provided between the fifth magnetic layer and the sixth magnetic layer,
the seventh non-magnetic layer includes at least one selected from the group consisting of Cu, Au, Cr, Al, V and Ag,
a fifth thickness of the fifth magnetic layer in the first direction is thicker than a fourth thickness of the fourth magnetic layer in the first direction, and
the fifth thickness is thicker than a sixth thickness of the sixth magnetic layer in the first direction.

6. The magnetic head according to claim 5, wherein a fourth thickness of the fourth magnetic layer in the first direction is thinner than a fifth thickness of the fifth magnetic layer in the first direction.

7. The magnetic head according to claim 5, wherein
the first non-magnetic layer contacts the first magnetic pole and the first magnetic layer,
the second non-magnetic layer contacts the first magnetic layer and the second magnetic layer,
the third non-magnetic layer contacts the second magnetic layer and the third magnetic layer,
the fourth non-magnetic layer contacts the third magnetic layer and the fourth magnetic layer,
the fifth non-magnetic layer contacts the fourth magnetic layer and the fifth magnetic layer,
the seventh non-magnetic layer contacts the fifth magnetic layer and the sixth magnetic layer, and
the sixth non-magnetic layer contacts the sixth magnetic layer and the second magnetic pole.

8. The magnetic head according to claim 5, wherein one end of the magnetic element is electrically connected to the first magnetic pole, another end of the magnetic element is electrically connected to the second magnetic pole, and
a differential electrical resistance of the magnetic element when a voltage between the first magnetic pole and the second magnetic pole is changed includes 3 or more peaks.

9. A magnetic recording device, comprising:
the magnetic head according to claim 5; and
a controller including an element circuit,
one end of the magnetic element being electrically connected to the first magnetic pole,
another end of the magnetic element being electrically connected to the second magnetic pole, and
the element circuit being configured to apply an element voltage between the first magnetic pole and the second magnetic pole.

10. The magnetic recording device according to claim 9, wherein
a differential electric resistance of the magnetic element when a voltage between the first magnetic pole and the second magnetic pole is changed includes a first negative peak, a second negative peak, a first positive peak and a second positive peak,
when the voltage is positive, a potential of the first magnetic pole is lower than a potential of the second magnetic pole,
when the voltage is negative, the potential of the first magnetic pole is higher than the potential of the second magnetic pole,
the voltage corresponding to the first negative peak is a first negative peak voltage being negative,
the voltage corresponding to the second negative peak is a second negative peak voltage being negative,
the voltage corresponding to the first positive peak is a first positive peak voltage being positive,
the voltage corresponding to the second positive peak is a second positive peak voltage being positive,
the second negative peak voltage is between the first negative peak voltage and the second positive peak voltage,
the first positive peak voltage is between the second negative peak voltage and the second positive peak voltage,
the element voltage satisfies one of a fifth condition and a sixth condition,
in the fifth condition, the element voltage is positive, the element voltage is equal to or higher than the second positive peak voltage, and
in the sixth condition, the element voltage is negative, and the absolute value of the element voltage is greater than or equal to the absolute value of the first negative peak voltage.

* * * * *